(12) United States Patent
Tanaka et al.

(10) Patent No.: US 8,976,275 B2
(45) Date of Patent: Mar. 10, 2015

(54) COLOR IMAGING ELEMENT

(71) Applicant: FUJIFILM Corporation, Tokyo (JP)

(72) Inventors: Seiji Tanaka, Saitama (JP); Tomoyuki Kawai, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/314,269

(22) Filed: Jun. 25, 2014

(65) Prior Publication Data

US 2014/0307131 A1 Oct. 16, 2014

Related U.S. Application Data

(63) Continuation of application No. PCT/JP2012/083843, filed on Dec. 27, 2012.

(30) Foreign Application Priority Data

Dec. 27, 2011 (JP) ................................. 2011-286012

(51) Int. Cl.
*H04N 3/14* (2006.01)
*H04N 9/04* (2006.01)
*H04N 9/07* (2006.01)

(52) U.S. Cl.
CPC . *H04N 9/045* (2013.01); *H04N 9/07* (2013.01)
USPC .......................................... 348/273; 348/280

(58) Field of Classification Search
USPC ................................. 348/273, 280
See application file for complete search history.

(56) References Cited

U.S. PATENT DOCUMENTS

| 2002/0149686 | A1 | 10/2002 | Taubman |
| 2004/0262493 | A1 | 12/2004 | Suzuki |
| 2006/0012808 | A1 | 1/2006 | Mizukura et al. |
| 2006/0017824 | A1* | 1/2006 | Kohashi ........................ 348/241 |
| 2007/0013786 | A1 | 1/2007 | Chiba et al. |

(Continued)

FOREIGN PATENT DOCUMENTS

| JP | 8-23543 A | 1/1996 |
| JP | 11-285012 A | 10/1999 |

(Continued)

OTHER PUBLICATIONS

International Search Report, issued in PCT/JP2012/083843, dated Feb. 12, 2013.

(Continued)

*Primary Examiner* — James Hannett
(74) *Attorney, Agent, or Firm* — Birch, Stewart, Kolasch & Birch, LLP

(57) ABSTRACT

A single-plate color imaging element, where a basic array pattern in which the color filters are arrayed according to an array pattern corresponding to M×N (M and N are even numbers equal to or more than 6) pixels in horizontal and vertical directions is formed, the basic array pattern includes two each of two types of a first sub array and a second sub array in which the color filters are arrayed according to an array pattern corresponding to (M/2)×(N/2) pixels, the color filters include first filters corresponding to a first color and second filters corresponding to a second color whose contribution rates are lower than a contribution rate of the first color, a ratio of a number of pixels of the first color being greater than a ratio of a number of pixels of each color of the second color.

11 Claims, 23 Drawing Sheets

(56) References Cited

U.S. PATENT DOCUMENTS

2008/0131028 A1 6/2008 Pillman et al.
2011/0019041 A1* 1/2011 Ishiwata et al. ............... 348/280

FOREIGN PATENT DOCUMENTS

| JP | 2000-308080 A | 11/2000 |
| JP | 2003-284084 A | 10/2003 |
| JP | 2007-37104 A | 10/2003 |
| JP | 2004-336469 A | 11/2004 |
| JP | 2005-136766 A | 5/2005 |
| JP | 2010-512048 A | 4/2010 |

OTHER PUBLICATIONS

Written Opinion of the International Searching Authority, issued in PCT/JP2012/083843, dated Feb. 12, 2013.

* cited by examiner

COLOR IMAGING ELEMENT

CROSS-REFERENCE TO RELATED APPLICATIONS

This application is a Continuation of PCT International Application No. PCT/JP2012/083843 filed on Dec. 27, 2012, which claims priority under 35 U.S.C §119(a) to Japanese Patent Application No. 2011-286012 filed on Dec. 27, 2011. Each of the above application(s) is hereby expressly incorporated by reference, in its entirety, into the present application.

BACKGROUND OF THE INVENTION

1. Field of the Invention

The present invention relates to a color imaging element, and, in particular, relates to a color imaging element which can reduce generation of color moire and convert a resolution into a higher resolution.

2. Description of the Related Art

In a single-plate color imaging element, a color filter of a single color is provided on each pixel, and therefore each pixel has only color information of a single color. Hence, an output image of a single-plate color imaging element becomes a RAW image (mosaic image), and therefore multichannel images are obtained by processing (demosaicing processing) of interpolating pixels of deficient colors from surrounding pixels. What matters in this case is reproduction characteristics of a high frequency image signal. Since the color imaging element is likely to cause aliasing in a captured image compared to a monochrome imaging element, an important task is to convert a resolution into a high resolution by expanding a reproduction band while suppressing generation of color moire (false color).

The demosaicing processing refers to processing of calculating all pieces of color information per pixel from a mosaic image corresponding to a color filter array of a single-plate color imaging element, and is also referred to as concurrent processing. For example, when an imaging element includes color filters of three colors RGB, the demosaicing processing is the process for calculating all pieces of color information of RGB per pixel from a mosaic image configured by RGB.

In a primary color Bayer array, which is the most widely used color array of color filters in the single-plate color imaging elements, green (G) pixels are arranged in a checkered pattern and red (R) and blue (B) are arranged in a line sequence, and therefore there is a problem with reproduction precision when G signals generate high frequency signals in diagonal directions, and when R and B signals generate high frequency signals in horizontal and vertical directions.

When a monochrome vertical stripe pattern (high frequency image) as indicated by the A portion in FIG. 25 is incident on a color imaging element including color filters of a Bayer array indicated by the B portion in FIG. 25, a color image of a mosaic pattern is provided in which R is light and flat, B is dark and flat and G is a light and dark as indicated by the C portion to E portion in FIG. 25 upon comparison with each color by sorting the pattern into the Bayer color array. Originally, a density difference (level difference) is not produced among RGB since the image is monochrome, but depending on a color array and an input frequency, a color is applied to the image.

Similarly, when a diagonally monochrome high frequency image as indicated by the A portion in FIG. 26 is incident on an imaging element including color filters of a Bayer array indicated by the B portion in FIG. 26, a color image is provided in which R and B are light and flat and G is dark and flat as indicated by the C to E portions in FIG. 26 upon comparison with each color by sorting the pattern into the Bayer color array. If a value of black is 0 and a value of white is 255, the diagonally monochrome high frequency image becomes green-colored since only G takes 255. Thus, the Bayer array cannot correctly reproduce a diagonal high frequency image.

Generally, in an imaging apparatus which uses single-plate color imaging elements, optical low pass filters made of a birefringent material such as crystal are arranged in front of the color imaging elements to optically suppress a high frequency wave. This method can reduce a tinge due to aliasing of a high frequency signal, but has a problem that the resolution lowers due to a negative effect of this method.

To solve such a problem, color imaging elements is proposed which adopt a three color random array which satisfies array limitation conditions that arbitrary pixels of interest are adjacent to three colors including colors of the pixels of interest in one of four sides of the pixels of interest (Japanese Patent Application Laid-Open No. 2000-308080; PTL 1).

Further, an image sensor is proposed which has a plurality of filters of different spectral sensitivities having a color filter array in which first filters and second filters are alternately arranged in a first predetermined cycle in one of diagonal directions of a pixel grid of the image sensor, while they are alternately arranged in a second predetermined cycle in the other one of the diagonal directions (Japanese Patent Application Laid-Open No. 2005-136766; PTL 2).

Furthermore, in a color solid state imaging element of three primary colors of RGB, a color array is proposed which makes each appearance probability of RGB equal, and allows arbitrary lines (horizontal, vertical and diagonal lines) on an imaging plane to transit all colors by arranging sets of three pixels of horizontally-arranged R, G and B in a zig-zag pattern in the vertical direction (Japanese Patent Application Laid-Open No. 11-285012; PTL 3).

Still further, a color imaging element is proposed in which R and B of the three primary colors of RGB are arranged every three pixels in the horizontal and the vertical directions, and G is arranged between these R and B (Japanese Patent Application Laid-Open No. 8-23543; PTL 4).

SUMMARY OF THE INVENTION

The color imaging element described in PTL 1 needs to optimize each random pattern when demosaicing processing is performed at a subsequent stage since a filter array is random, and has a problem that the demosaicing processing becomes complicated. Further, the random array is effective for color moire of a low frequency, but is not effective for a false color of a high frequency portion.

Furthermore, the image sensor described in PTL 2 has a problem that pixel reproduction precision is poor in a limited resolution region (in the diagonal directions in particular), because G pixels (brightness pixels) are arranged in a checkered pattern.

The color solid state imaging element described in PTL 3 provides an advantage that it is possible to suppress generation of a false color since there are filters of all colors on arbitrary lines, but has a problem that high frequency reproducibility lowers compared to the Bayer array because the ratios of the numbers of pixels of RGB are equal. In case of the Bayer array, the ratio of the number of pixels of G, which contributes the most to acquisition of a brightness signal, is twice as much as the numbers of pixels of R and B.

On the other hand, in the color imaging element described in PTL 4, the ratio of the number of pixels of G with respect to the numbers of pixels of R and B is higher than the ratio of that in the Bayer array, but is not effective for a false color of a high frequency portion in a horizontal or vertical direction because there are lines of only G pixels in the horizontal or vertical direction.

The present invention has been made in light of such a situation, and an object of the present invention is to provide a color imaging element which can suppress generation of a false color and convert a resolution into a higher resolution, and simplify processing at a subsequent stage compared to a conventional random array.

To achieve the above-mentioned object, the invention according to one aspect of the present invention is a single-plate color imaging element which is formed by disposing color filters on a plurality of pixels formed with photoelectric conversion elements arrayed in a horizontal direction and a vertical direction, an array of the color filters includes a basic array pattern in which the color filters are arrayed according to an array pattern corresponding to M×N (M and N are even numbers equal to or more than 6) pixels in a horizontal direction and a vertical direction, and is formed by repeatedly arranging the basic array pattern in the horizontal direction and the vertical direction, the basic array pattern includes two each of two types of a first sub array and a second sub array in which the color filters are arrayed according to an array pattern corresponding to (M/2)×(N/2) pixels, the first and second sub arrays are arranged mutually adjacent in the horizontal direction and the vertical direction, the color filters include first filters corresponding to a first color with one or more colors and second filters corresponding to a second color with two or more colors whose contribution rates for acquiring a brightness signal are lower than a contribution rate of the first color, a ratio of a number of pixels of the first color corresponding to the first filter is greater than a ratio of a number of pixels of each color of the second color corresponding to the second filters, the first filters are arranged in a rectangular shape in an outer peripheral portion of the first sub array, and are arranged in a center portion of the second sub array, and one or more of the second filters corresponding to each color of the second color are arranged on each filter line in the horizontal and vertical directions of the array of the color filter in the basic array pattern.

In the invention according to one aspect of the present invention, the basic array pattern is formed by the two types of the first sub array and the second sub array which are arranged mutually adjacent in the horizontal direction and the vertical direction, and one or more of the first filters are arranged on each filter line in the horizontal, vertical, diagonal upper right and diagonal lower left directions of the color filter array by arranging the first filters in a rectangular pattern in the outer peripheral portion of the first sub array and arranging the first filters in the center portion of the second sub array, so that it is possible to increase reproduction precision of demosaicing processing in a high frequency region.

Further, in the color filter array, basic array patterns are repeatedly arranged in the horizontal and the vertical directions, so that it is possible to perform processing according to a repetition pattern when performing the demosaicing processing at a subsequent stage, and simplify the processing at the subsequent stage compared to the conventional random array.

Furthermore, one or more of the second filters corresponding to each color of the second color with two or more colors other than the first color are arranged on each filter line in horizontal and vertical directions of the color filter array in the basic array pattern, so that it is possible to suppress generation of color moire (false color) and convert a resolution into a high resolution.

The ratios of the number of pixels of the first color corresponding to the first filters and the number of pixels of each color of the second color with two or more colors corresponding to the second filters are different, and in particular the ratio of the number of pixels of the first color whose contribution rate for acquiring a brightness signal is high is greater than a ratio of the number of pixels of each color of the second color corresponding to the second filters, so that it is possible to suppress aliasing and high frequency reproducibility is also good.

Further, the basic array pattern is formed by an array pattern corresponding to M (even number)×N (even number) pixels, so that, when, for example, a color imaging element is a CMOS (Complementary Metal Oxide Semiconductor) imaging element, it is possible to share one amplifier circuit among an even number of (for example, four) pixels.

In the color imaging element according to another aspect of the present invention, it is preferable that one or more of the second filters are arranged on the lines in diagonal upper right and diagonal lower right directions of the array of the color filters. Consequently, it is possible to suppress generation of color moire (false color) and convert the resolution into the high resolution.

In the color imaging element according to still another aspect of the present invention, the second filters of the different second color are arranged in center portions of two first sub arrays in the basic array pattern. Consequently, the second filters of each color are arranged on those lines in the diagonal upper right and diagonal lower right directions of the array of the color filters that pass the center portions of the two first sub arrays, in the basic array pattern.

In the color imaging element according to still another aspect of the present invention, arrangements of the second filters corresponding to each color of the second color are different from each other in two second sub arrays in the basic array pattern. Consequently, one or more of the second filters of each color can be arranged on each filter line in the horizontal, vertical, diagonal upper right and diagonal lower right directions of the array of the color filters in the basic array pattern.

In the color imaging element according to still another aspect of the present invention, the second filters corresponding to each color of the second color in the second sub array are each arranged point-symmetrically with respect to the center of the second sub array. Consequently, the second filters of each color can be arranged on each filter line in the horizontal, vertical, diagonal upper right and the diagonal lower right directions of the array of the color filters in the basic array pattern.

In the color imaging element according to still another aspect of the present invention, the first color is green (G) and the second color is red (R) and blue (B), and the Bayer array is formed by the first and second filters arranged at positions of intersections between the vertical lines arranged at (M/2) line intervals in the horizontal direction and the horizontal lines arranged at (N/2) line intervals in the vertical direction of the array of the color filters, based on the horizontal line and the vertical line that include an arbitrary color filter of the array of the color filters. Consequently, when the color imaging element is thinned, read and driven, it is possible to perform demosaicing processing or the like corresponding to the known Bayer array and, consequently, prevent the demosaicing processing or the like from becoming complicated.

In the color imaging element according to still another aspect of the present invention, when M and N are each 8 or more, a square array corresponding to 2×2 pixels formed with the first filters is included in a center portion of the second sub array. Consequently, it is possible to use pixel values of 2×2 pixels to determine a direction of high correlation among the horizontal, vertical, diagonal upper right and diagonal lower right directions.

In the color imaging element according to still another aspect of the present invention, it is preferable that M and N are each 10 or less. When M and N exceed 10 (M and N>10), while signal processing such as demosaicing processing becomes complicated, a special effect cannot be provided even by increasing a size of the basic array pattern.

In the color imaging element according to still another aspect of the present invention, it is preferable that M and N satisfy M=N. Further, in the color imaging element according to still another aspect of the present invention, it is preferable that M and N satisfy M≠N. Note that an imaging apparatus which has the above-mentioned color imaging element is also incorporated in the present invention.

According to the present invention, one or more of the first filters corresponding to the first color whose contribution rate for acquiring a brightness signal is high are arranged on each filter line in the horizontal, vertical, diagonal upper right and diagonal lower right directions of the color filter array, and the ratio of the number of pixels of the first color corresponding to the first filters is greater than the ratio of the number of pixels of each color of the second color corresponding to the second filters with two or more colors other than the first color, so that it is possible to increase reproduction precision of demosaicing processing in a high frequency region, and suppress aliasing.

Further, one or more of the second filters corresponding to each color of the second color with two or more colors other than the first color are arranged on each filter line in the horizontal and vertical directions of the color filter array in the basic array pattern, so that it is possible to suppress generation of color moire (false color) and convert a resolution into a high resolution.

Further, in the array of the color filter according to the present invention, the basic array patterns are repeated in the horizontal and the vertical directions, so that it is possible to perform processing according to a repetition pattern when performing demosaicing processing at a subsequent stage, and simplify the processing at a subsequent stage compared to the conventional random array.

DETAILED DESCRIPTION OF THE PREFERRED EMBODIMENTS

Preferred embodiments of the present invention are described below in detail with reference to the accompanying drawings.

[Entire Configuration of Color Imaging Apparatus]

Figure 1:
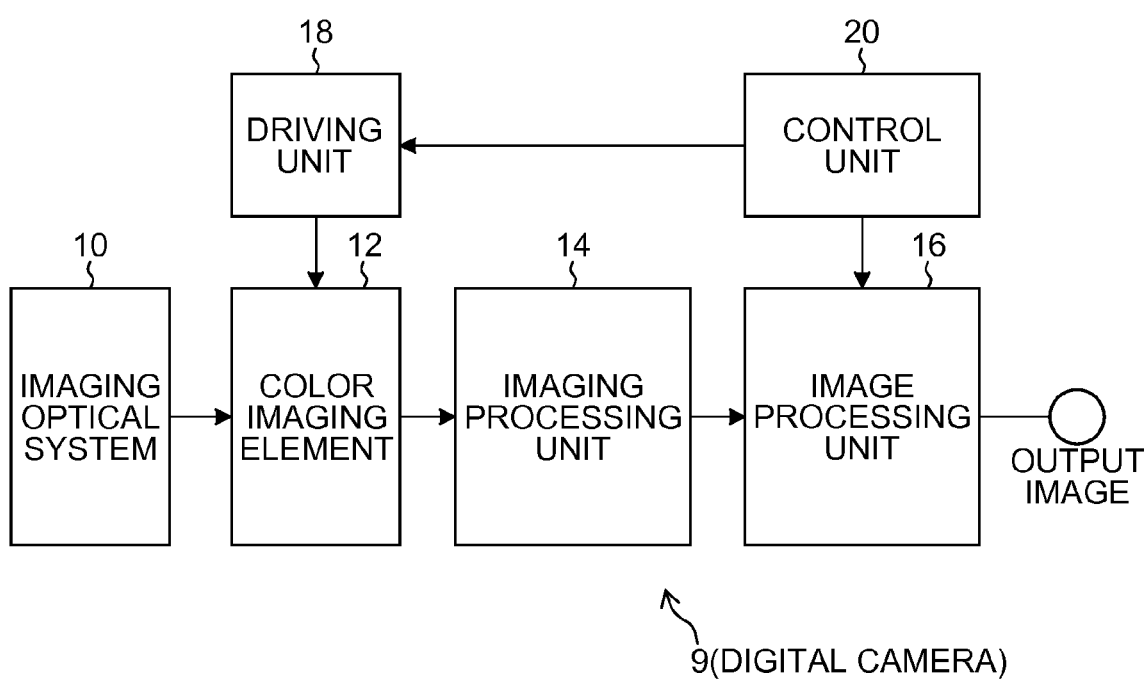
FIG. 1 is a view illustrating a digital camera which has a single-plate color imaging element according to the present invention.

FIG. 1 is a block diagram of a digital camera 9 which has color imaging elements according to the present invention. The digital camera 9 roughly has an imaging optical system 10, a color imaging element 12, an imaging processing unit 14, an image processing unit 16, a driving unit 18 and a control unit 20 or the like.

The imaging optical system 10 captures an image of a subject, and an optical image which shows a subject image is formed on a light receiving plane of the color imaging element 12 (a color imaging element according to the first embodiment).

Figure 2:
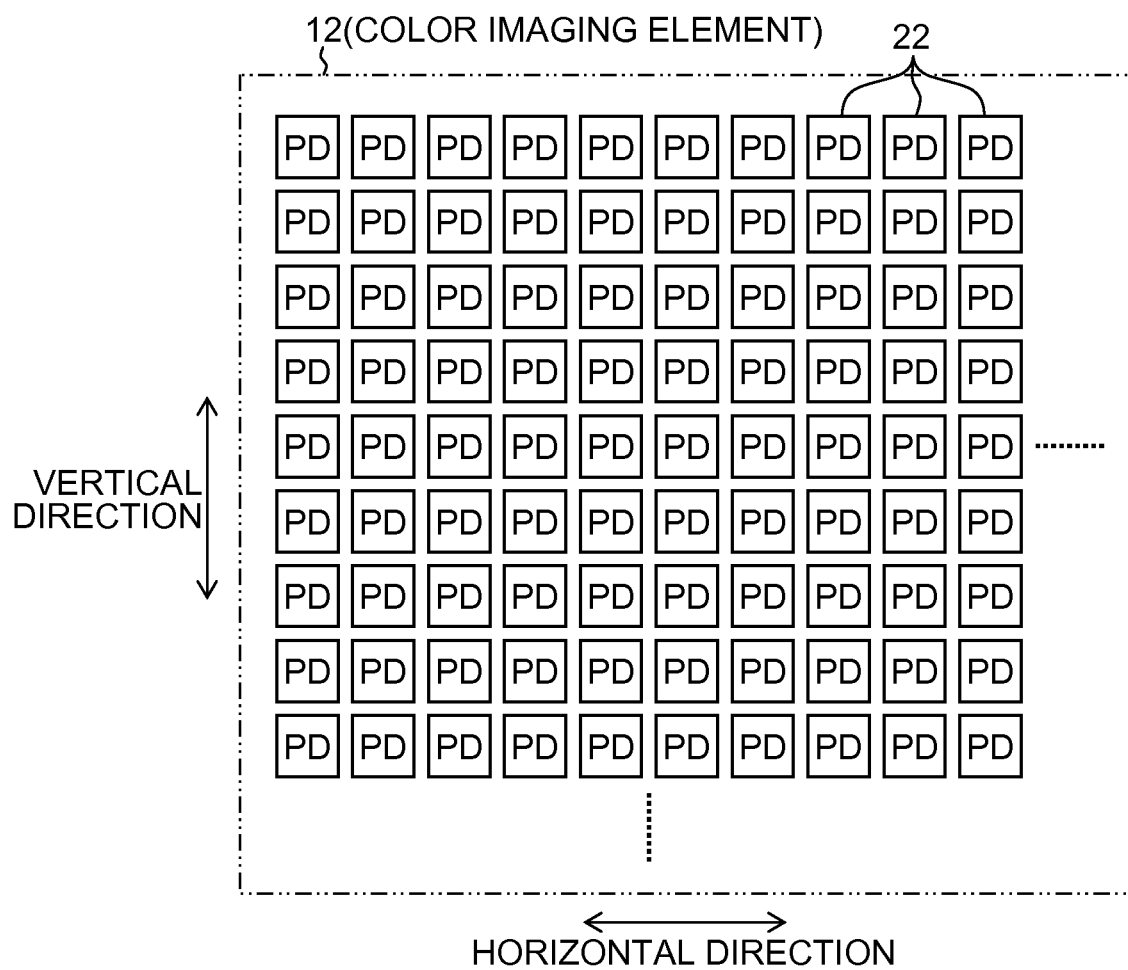
FIG. 2 is a view illustrating pixels of the single-plate color imaging element according to the present invention.

The color imaging element 12 is a so-called single-plate color imaging element which has on an imaging plane a plurality of pixels formed with photoelectric conversion elements arrayed (two-dimensionally arrayed) in a horizontal direction and a vertical direction in FIG. 2, and color filters of a specific color filter array arranged above the light receiving plane of each pixel. In this regard, "above" refers to a direction from which subject light is incident on the imaging plane of the color imaging element 12.

A subject image formed on the color imaging element 12 is converted into a signal charge corresponding to the amount of incident light by the photoelectric conversion element of each pixel. Signal charges accumulated in each photoelectric conversion element are sequentially read from the color imaging element 12 as voltage signals (image signals) corresponding to the signal charge based on a driving pulse given from the driving unit 18 according to a command of the control unit 20. The image signals read from the color imaging element 12 are R, G and B signals indicating red (R), green (G) and blue (B) mosaic images corresponding to the color filter array of the color imaging element 12. Note that the color imaging element 12 is not limited to a CCD (Charge Coupled Device) color imaging element, and may be other types of imaging elements such as a CMOS imaging element.

The image signals read from the color imaging element 12 are inputted to the imaging processing unit 14. The imaging processing unit 14 has a correlated double sampling circuit (CDS) which cancels reset noise included in the image signals, an AGC circuit which amplifies an image signal and controls the image signal at a certain level of magnitude, and an A/D converter. This imaging processing unit 14 performs correlated double sampling processing on the inputted image signal and amplifies the image signal, and then outputs RAW data obtained by converting the image signal into a digital image signal, to the image processing unit 16.

The image processing unit 16 has a white balance correction circuit, a gamma correction circuit, a demosaicing processing circuit (a processing circuit which calculates (converts in a concurrent way) all pieces of color information of RGB per pixel from RGB mosaic images related to the color filter array of the single-plate color imaging element 12), a brightness/color difference signal generation circuit, an outline correction circuit, a color correction circuit, or the like. The image processing unit 16 applies required signal processing to the RAW data of the mosaic images inputted from the imaging processing unit 14 according to the command from the control unit 20, and generates image data (YUV data) which includes brightness data (Y data) and color difference data (Cr and Cb data).

The image data generated by the image processing unit 16 is subjected to compression processing by a compression/extension processing circuit based on the JPEG standards when the image data is a still image, or based on the MPEG2 standards when the image data is a moving image, and then the image data is recorded in a recording medium (e.g. a memory card) not illustrated or is outputted to be displayed on display means (not illustrated) such as a liquid crystal monitor.

Color Imaging Element According to First Embodiment

Figure 3:
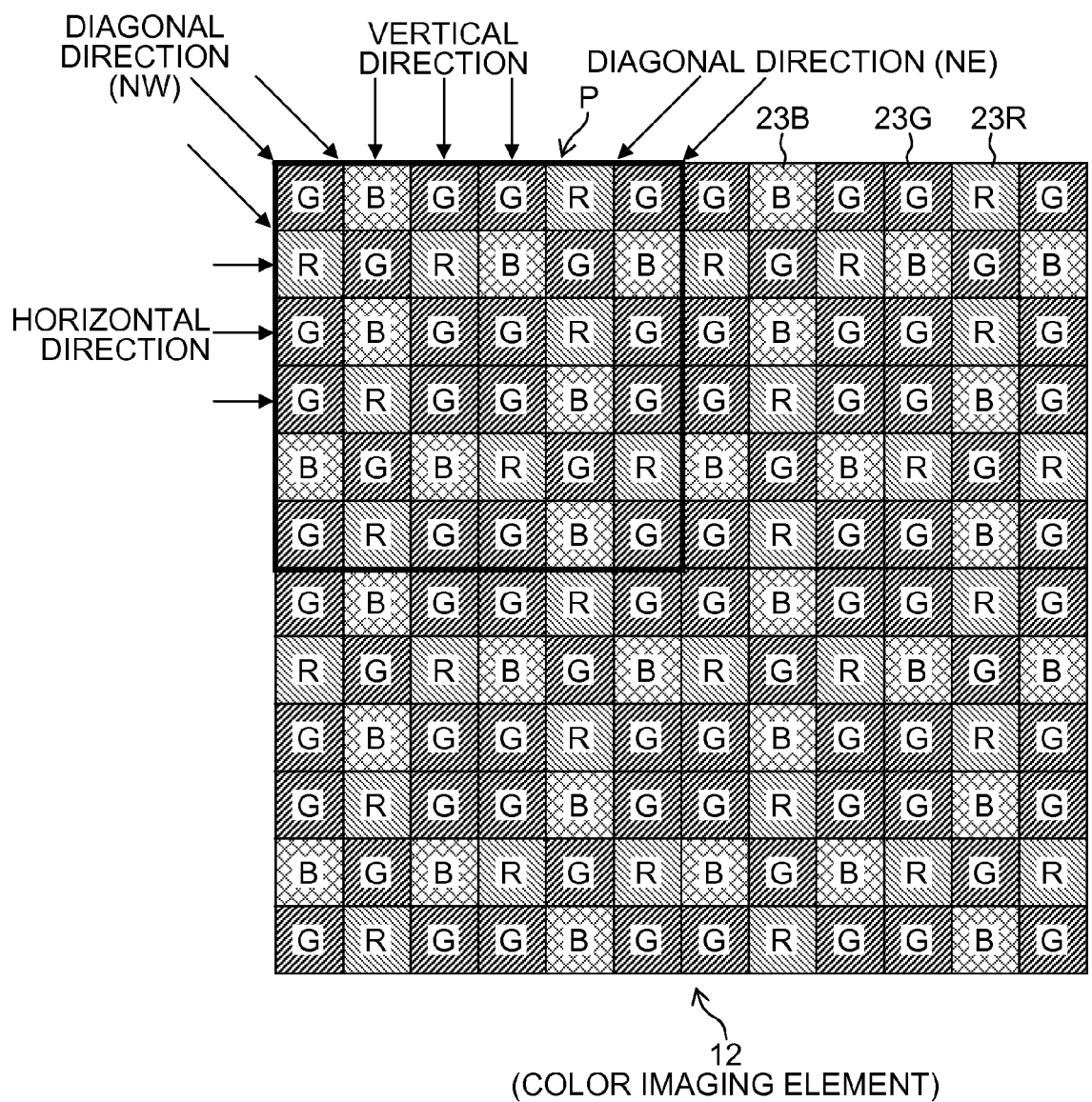
FIG. 3 is a view illustrating a single-plate color imaging element according to a first embodiment of the present invention.

FIGS. 2 and 3 are views illustrating a single-plate color imaging element according to a first embodiment of the present invention. FIG. 2 illustrates a pixel array of pixels provided to the color imaging element 12 and FIG. 3 illustrates a color filter array of color filters.

As illustrated in FIG. 2, the color imaging element 12 has a plurality of pixels formed with photoelectric conversion elements 22 arrayed (two-dimensionally arrayed) in the horizontal direction and the vertical direction, and color filters of a color filter array, as illustrated in FIG. 3, arranged above the light receiving plane of each pixel. Any one of color filters 23R, 23G and 23B of three primary colors of RGB (referred to as an R filter, a G filter and a B filter) is arranged on each pixel. Hereinafter, a pixel on which the R filter 23R is arranged is referred to as an "R pixel", a pixel on which the G filter 23G is arranged is referred to as a "G pixel", and a pixel on which the B filter 23B is arranged is referred to as a "B pixel".

<Features of Color Filter Array>

The color filter array of the color imaging element 12 according to the first embodiment includes the following features (1), (2), (3), (4), (5) and (6).

[Feature (1)]

The color filter array illustrated in FIG. 3 includes a basic array pattern P (a pattern indicated by a bold frame in the figure) formed with a square array pattern corresponding to 6×6 pixels, and this basic array pattern P is repeatedly arranged in the horizontal direction and the vertical direction. That is, in this color filter array, the R filters 23R, the G filters 23G and the B filters 23B of each color of R, G and B are cyclically arrayed.

As described above, the R filters 23R, the G filters 23G and the B filters 23B are cyclically arrayed, so that it is possible to perform processing according to a repetition pattern when performing demosaicing processing and the like on R, G and B signals read from the color imaging element 12.

Further, when thinning processing is performed in units of the basic array patterns P to reduce an image, the color filter array after the thinning processing is the same as the color filter array before the thinning processing and a common processing circuit can be used.

[Feature (2)]

In the color filter array illustrated in FIG. 3, the G filters 23G corresponding to a color (the color of G in the present embodiment) which contributes the most to acquisition of a brightness signal are arranged on each filter line in the horizontal, vertical and diagonal (NE, NW) directions of the color filter array. In this regard, NE designates a diagonal upper right direction, and NW designates a diagonal lower right direction. The diagonal upper right and lower right directions are each of the directions of 45° with respect to the horizontal direction in the case of, for example, a square array of pixels, and are the directions of diagonal lines of a rectangular shape in the case of a rectangular array of pixels, and the angle of its direction may vary according to lengths of long sides and short sides.

One or more of the G filters 23G corresponding to brightness pixels are arranged on each filter line in the horizontal, vertical and diagonal (NE, NW) directions of the color filter array, so that it is possible to increase reproduction precision of the demosaicing processing in a high frequency region irrespectively of a direction in which a high frequency wave is provided.

[Feature (3)]

According to the basic array pattern P of the color filter array illustrated in FIG. 3, the numbers of pixels of R pixels, G pixels and B pixels corresponding to the RGB filters 23R, 23G and 23B in this basic array pattern are 8 pixels, 20 pixels and 8 pixels, respectively. That is, the ratios of the numbers of pixels of the RGB pixels are 2:5:2, and the ratio of the number of pixels of G pixels which contributes the most to acquisition of a brightness signal is greater than ratios of the numbers of pixels of R pixels and B pixels of other colors.

As described above, the ratios of the number of pixels of G pixels and the numbers of pixels of R and B pixels are different and in particular the ratio of the number of pixels of G pixels which contribute the most to acquisition of a brightness signal is greater than the ratios of the numbers of pixels of R and B pixels, so that it is possible to suppress aliasing upon demosaicing processing and it is also possible to enhance high frequency reproducibility.

[Feature (4)]

In the color filter array illustrated in FIG. 3, one or more of the R filters 23R and B filters 23B corresponding to two or more colors of other colors (R and B colors in the present embodiment) except for the above-mentioned G color are arranged on each filter line in the horizontal and vertical directions of the color filter array in each basic array pattern P.

The R filters 23R and the B filters 23B are each arranged on each filter line in the horizontal and vertical directions of the color filter array, so that it is possible to suppress generation of color moire (false color). Consequently, it is possible to prevent an optical low pass filter which suppresses generation of a false color from being arranged on an optical path from an incident surface to the imaging plane in the optical system, or to apply an optical low pass filter whose function of cutting a high frequency component for preventing generation of a false color is weak even when the optical low pass filter is applied, and thus it is possible to prevent the resolution from lowering.

Figure 4:
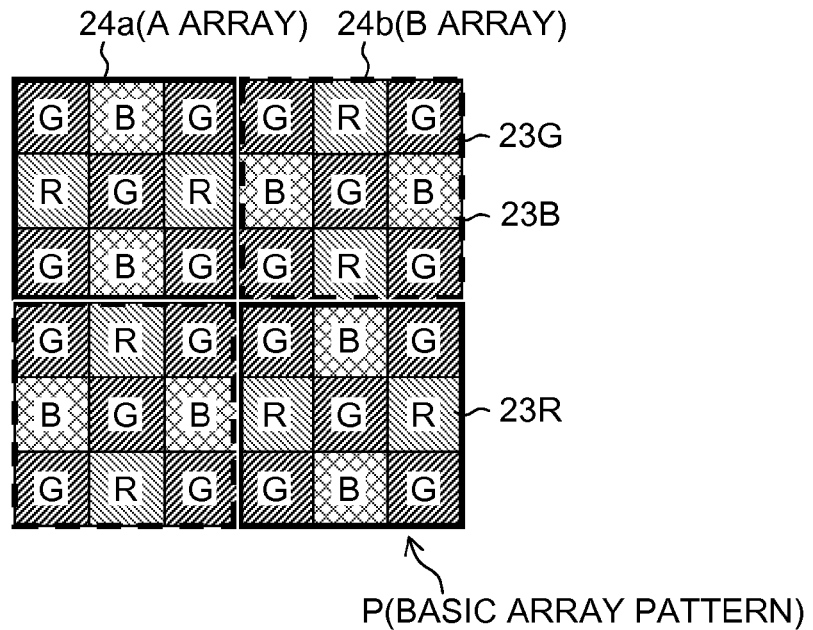
FIG. 4 is a view illustrating a basic array pattern included in a color filter array of the color imaging element according to the first embodiment.

FIG. 4 illustrates a state where the basic array pattern P illustrated in FIG. 3 is divided by four into 3×3 pixels.

As illustrated in FIG. 4, the basic array pattern P can also be regarded as an array in which A arrays 24a of 3×3 pixels surrounded by solid lines in the figure and B arrays 24b of 3×3 pixels surrounded by broken lines in the figure are alternately arranged in the horizontal and vertical directions.

Each of the A arrays 24a and the B arrays 24b has the G filters 23G, which are brightness pixels, arranged at four corners and in the center along both diagonal lines. Further, in the A array 24a, the R filters 23R are arrayed in the horizontal direction across the center G filter 23G, and the B filters 23B are arrayed in the vertical direction. Meanwhile, in the B array 24b, the B filters 23B are arrayed in the horizontal direction across the center G filter 23G, and the R filters 23R are arrayed in the vertical direction. That is, although a positional relationship between the R filters 23R and the B filters 23B is reversed between the A array 24a and the B array 24b, other arrangement is the same.

Figure 5:
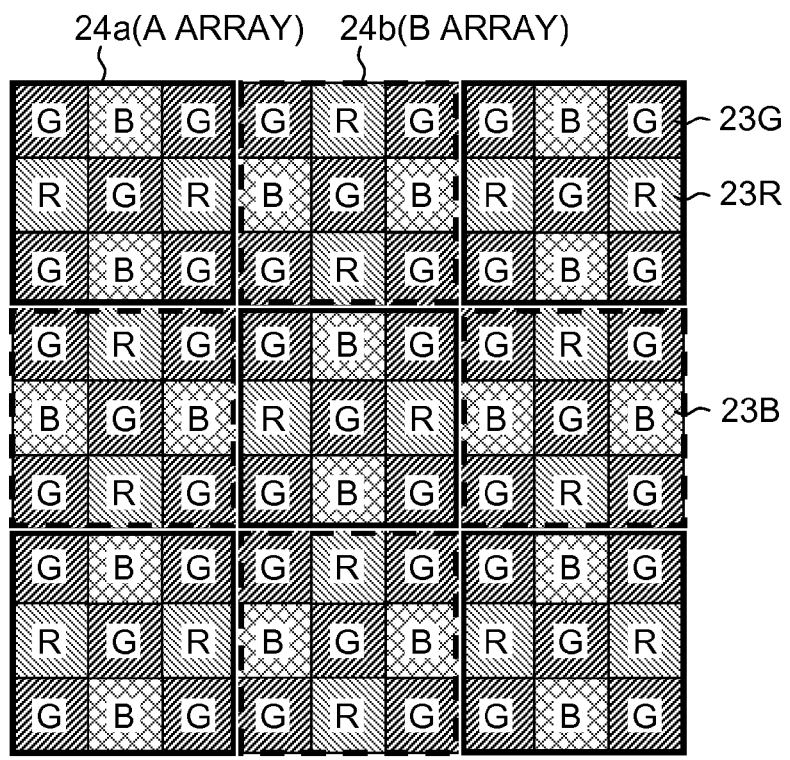
FIG. 5 is a view illustrating an arrangement in which basic array patterns of 6×6 pixels included in the color filter array of the color imaging element according to the first embodiment are divided into A arrays and B arrays of 3×3 pixels, and arranged.

Further, the A arrays and the B arrays are alternately arranged in the horizontal and vertical directions as illustrated in FIG. 5, so that the G filters 23G at the four corners in the A array 24a and the B array 24b make up the G filters 23G of square arrays corresponding to 2×2 pixels.

This is because the G filters 23G which are brightness pixels are arranged at four corners and in the center of 3×3 pixels of the A array 24a or the B array 24b, and these 3×3 pixels are alternately arranged in the horizontal direction and the vertical direction to form the G filters 23G of the square arrays corresponding to 2×2 pixels. Note that by making this array, the above-mentioned features (1), (2) and (3), as well as the feature (5) described below are satisfied.

[Feature (5)]

The color filter array illustrated in FIG. 3 includes a square array 25 corresponding to 2×2 pixels provided with the G filters 23G (hereinafter simply referred to as G square array 25, see FIG. 6).

Figure 6:
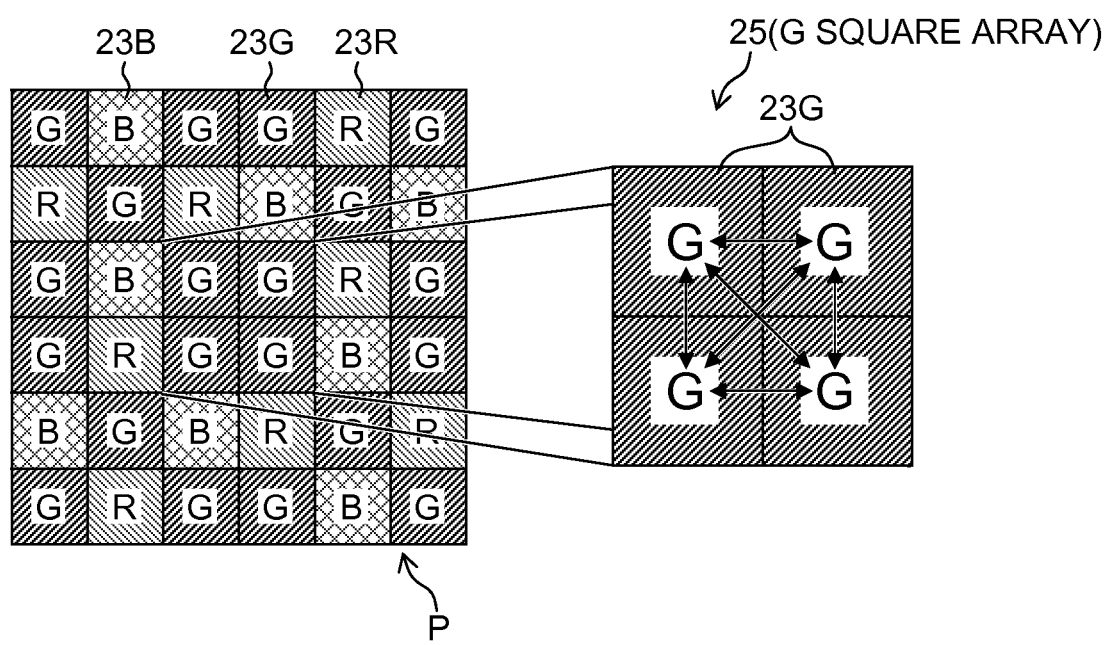
FIG. 6 is a view used to explain a method of determining a correlation direction from pixel values of G pixels of 2×2 pixels included in the color filter array of the color imaging element according to the first embodiment.

As illustrated in FIG. 6, by extracting 2×2 pixels provided with the G filters 23G, and calculating a differential absolute value of pixel values of G pixels in the horizontal direction, a differential absolute value of pixel values of G pixels in the vertical direction and a differential absolute value of pixel values of G pixels in the diagonal directions (diagonal upper right and diagonal lower right directions), it is possible to determine that there is a correlation in a direction of a small differential absolute value among the horizontal direction, the vertical direction and the diagonal directions.

That is, according to this color filter array, it is possible to determine a direction of a high correlation among the horizontal direction, the vertical direction and the diagonal directions using information of G pixels of a minimum pixel interval. This direction determination result can be used for processing of interpolating pixels from surrounding pixels (demosaicing processing). Consequently, the image processing unit 16 can execute the demosaicing processing.

Further, as illustrated in FIG. 5, when pixels of the A array 24a or the B array 24b of 3×3 pixels are target pixels of the demosaicing processing, and 5×5 pixels (a local region of a mosaic image) are extracted around the A array 24a or the B array 24b, there are G pixels of 2×2 pixels at four corners of 5×5 pixels. By using these pixel values of G pixels of 2×2 pixels, it is possible to precisely determine a correlation direction of four directions using information of G pixels of a minimum pixel interval.

[Feature (6)]

The basic array pattern P of the color filter array illustrated in FIG. 3 is point-symmetric with respect to the center of the basic array pattern P (the center of the four G filters 23G). Further, as illustrated in FIG. 4, also the A array 24a and the B array 24b in the basic array pattern P are each point-symmetric with respect to the center G filters 23G.

This symmetry allows a circuit scale of a processing circuit at a subsequent stage to be miniaturized or simplified.

Figure 7:
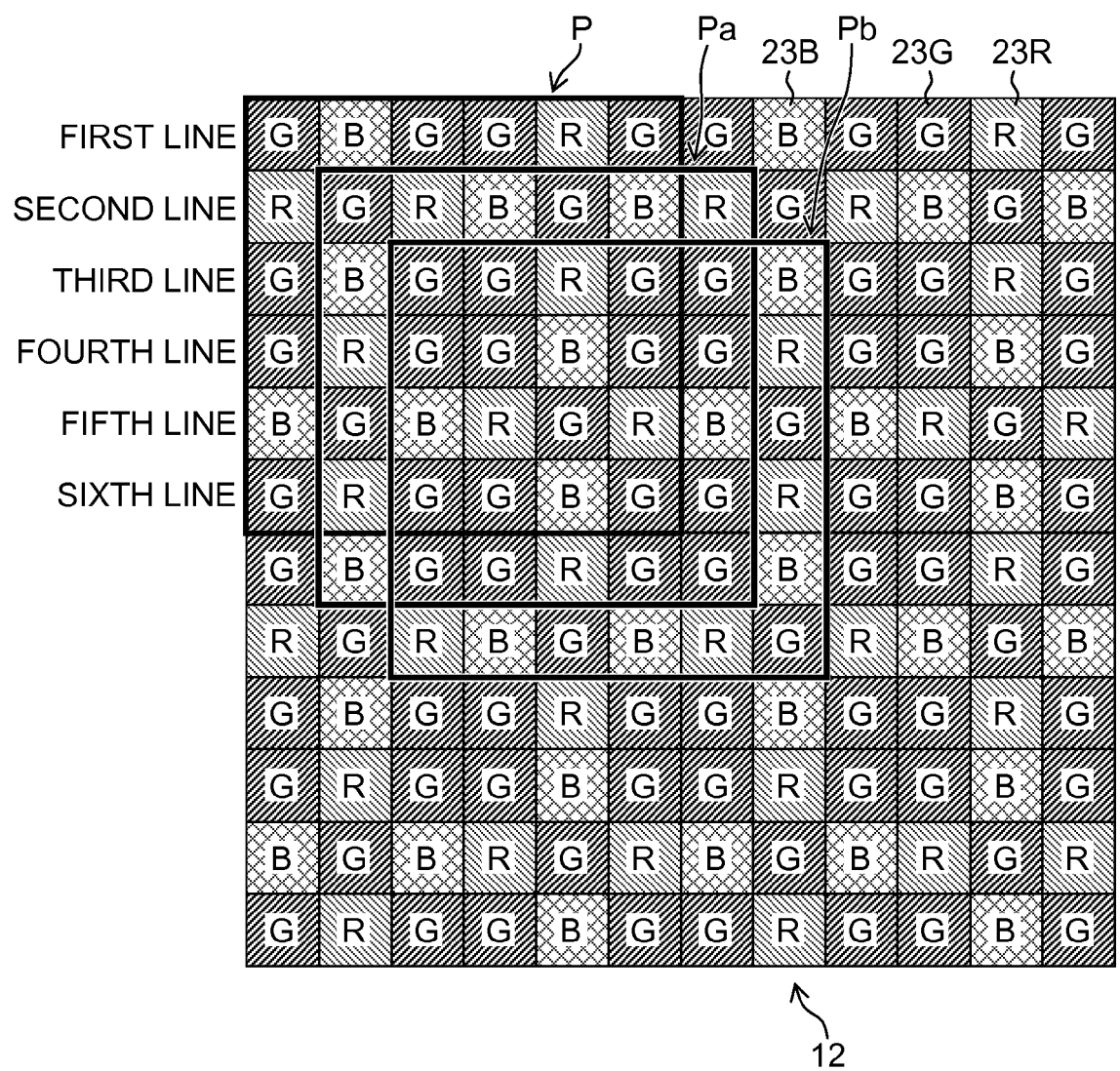
FIG. 7 is a view used to explain a concept of basic array patterns included in the color filter array of the color imaging element.

In the basic array pattern P indicated by a bold frame as illustrated in FIG. 7, color filter arrays in the first and third lines out of the first to sixth lines in the horizontal direction are GBGGRG, a color filter array of the second line is RGRBGB, color filter arrays of the fourth and sixth lines are GRGGBG, and a color filter array of the fifth line is BGBRGR.

Now, in FIG. 7, when a basic array pattern shifted by one pixel from the basic array pattern P in the horizontal direction and the vertical direction is Pa and a basic array pattern shifted by two pixels is Pb, even if these basic array patterns Pa and Pb are repeatedly arranged in the horizontal direction and the vertical direction, the same color filter array is provided.

That is, there are a plurality of basic array patterns which can form the color filter array illustrated in FIG. 7 by repeatedly arranging basic array patterns in the horizontal direction and the vertical direction. In the first embodiment, the basic array pattern P whose basic array pattern is point-symmetric is referred to as a basic array pattern for the sake of convenience.

Note that although color filter arrays according to other embodiments described below also include a plurality of basic array patterns for each color filter array, a representative one is referred to as a basic array pattern of the color filter array.

Color Imaging Element According to Second Embodiment

Figure 8:
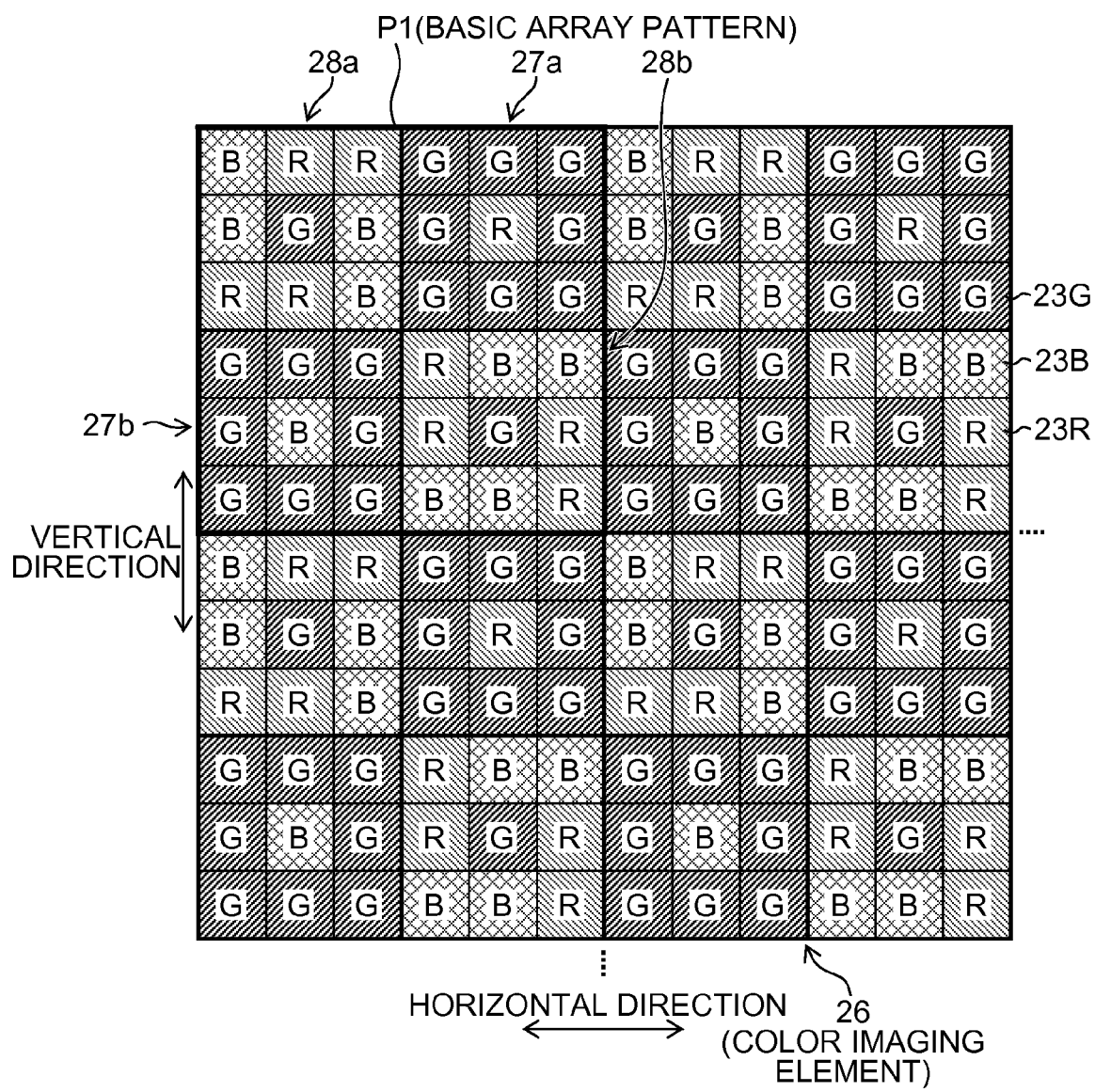
FIG. 8 is a view illustrating a single-plate color imaging element according to a second embodiment of the present invention.

FIG. 8 is a view illustrating a single-plate color imaging element according to a second embodiment of the present invention and, in particular, illustrates a color filter array of the color imaging element. The color imaging element 26 according to the second embodiment employs basically the same configuration as the configuration in the above-mentioned first embodiment except that color filter array is different. Therefore, the same functions and configurations as the functions and the configurations of the above-mentioned first embodiment are assigned the same reference numerals, and descriptions thereof are omitted. Further, each filter line in the horizontal, vertical and diagonal (NE, NW) directions of the color filter array is abbreviated as a "horizontal line", a "vertical line" and "diagonal (NE and NW) lines", respectively below.

The color filter array of the color imaging element 26 (referred to simply as a color filter array below) includes a basic array pattern P1 in which the RGB filters 23R, 23G and 23B are arrayed according to an array pattern corresponding to 6×6 pixels, and is formed by repeatedly arranging the basic array pattern P1 in the horizontal direction and the vertical direction. Hence, the color filter array includes the above-mentioned feature (1).

Figure 9:
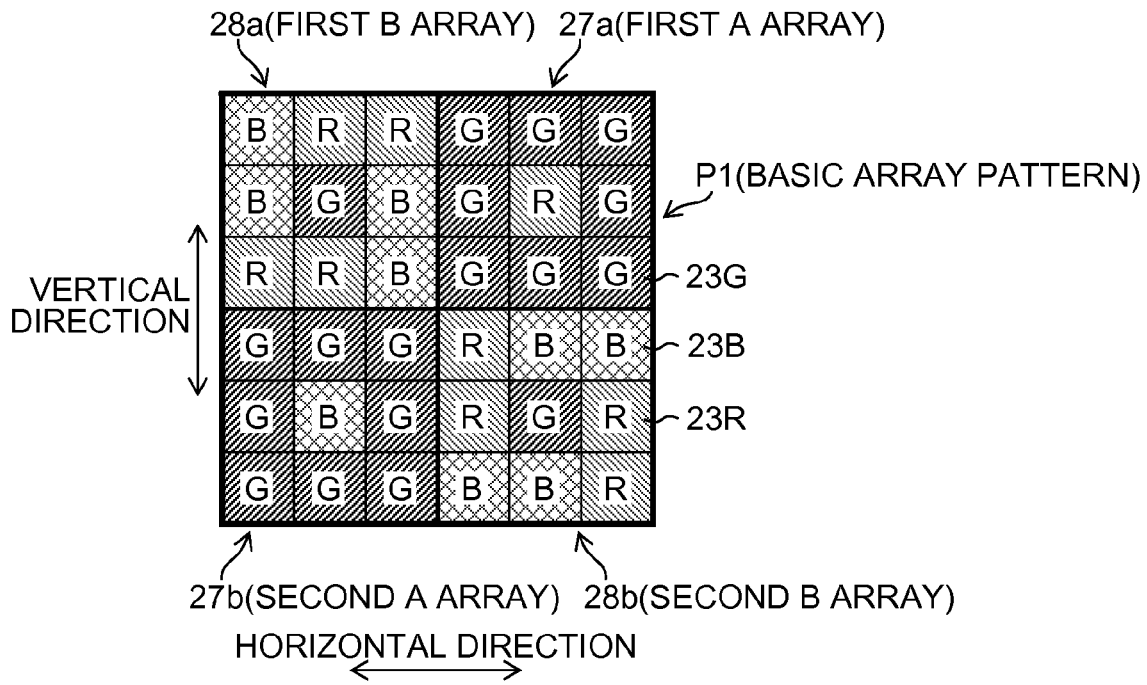
FIG. 9 is a view illustrating a basic array pattern included in a color filter array of the color imaging element according to the second embodiment.

As illustrated in FIG. 9, the basic array pattern P1 is formed by four types of sub arrays including an array pattern corresponding to 3×3 pixels. These four types of the sub arrays are two types of a first A array 27a and a second A array 27b corresponding to first sub arrays of the present invention, and two types of a first B array 28a and a second B array 28b corresponding to second sub arrays of the present invention.

The first and second A arrays 27a and 27b and the first and second B arrays 28a and 28b are arranged mutually adjacent in the horizontal direction and the vertical direction of the color filter array in a square matrix pattern. Specifically, the first A array 27a and the first B array 28a, as well as the second A array 27b and the second B array 28b are each adjacent in the horizontal direction. Further, the first A array 27a and the second B array 28b, as well as the second A array 27b and the first B array 28a are each adjacent in the vertical direction. Furthermore, the first A array 27a and the second A array 27b, as well as the first B array 28a and the second B array 28b are adjacent in the diagonal direction.

Figure 10:
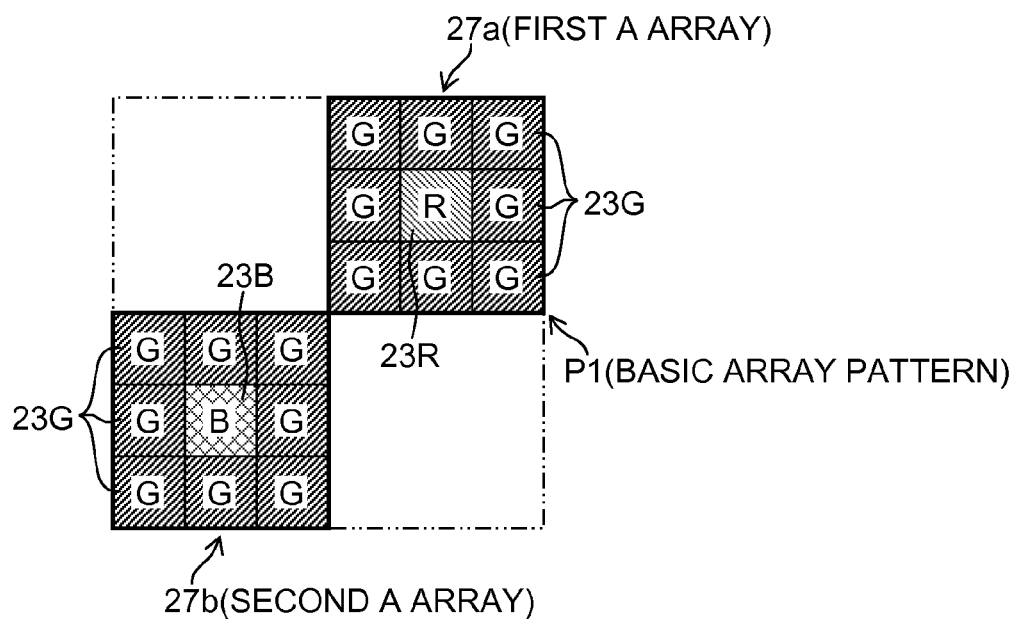
FIG. 10 is an enlarged view of a first A array and a second A array in FIG. 9.

As illustrated in FIG. 10, the G filters 23G are arranged in the outer peripheral portion of the first A array 27a in a rectangular pattern. Further, the R filter 23R is arranged in the center portion of the first A array 27a surrounded by the G filters 23G. Meanwhile, the second A array 27b is an array in which the R filter 23R of the first A array 27a is replaced with the B filter 23B.

Figure 11:
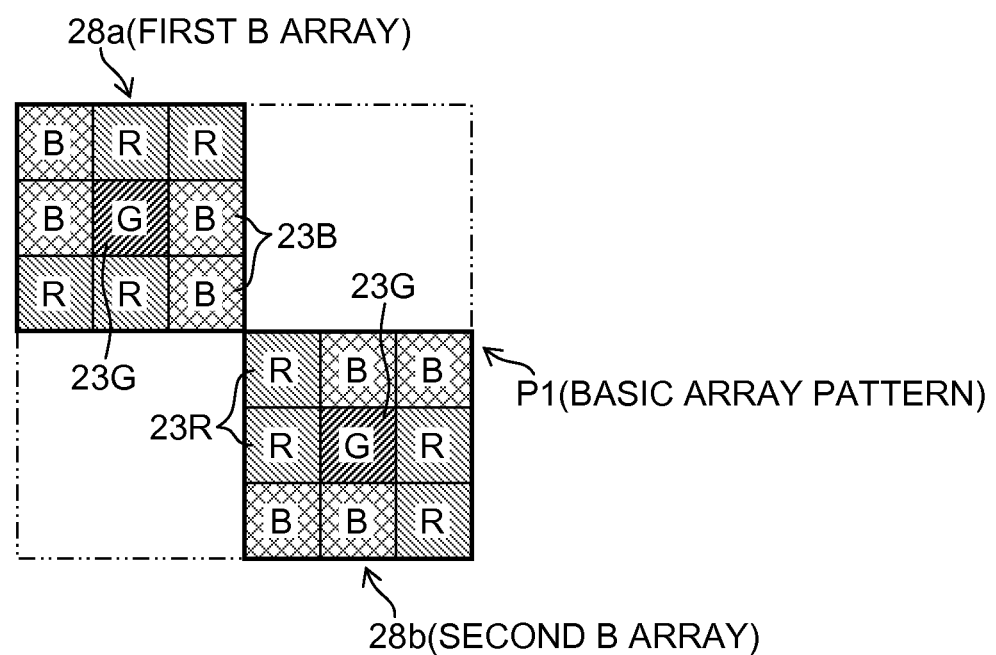
FIG. 11 is an enlarged view of a first B array and a second B array in FIG. 9.

As illustrated in FIG. 11, the G filter 23G is arranged in the center portion of the first B array 28a. Further, the R filters 23R and the B filters 23B are arranged in the outer peripheral portion of the first B array 28a to surround the G filter 23G. Specifically, the B filters 23B and the R filters 23R are alternately arranged two pixels by two pixels (BBRRBBRR) along the counterclockwise direction in the figure from an upper left corner of the first B array 28a in the figure.

According to this array, in the first B array 28a, an arrangement of the B filters 23B and an arrangement of the R filters 23R are point-symmetric with respect to the center of the first B array 28a. Further, in the first B array 28a, the B filters 23B are arranged on the horizontal line which passes the R filters 23R of the first A array 27a, and the R filters 23R are arranged on the vertical line which passes the B filters 23B of the second A array 27b (see FIG. 8). Furthermore, one or more of each of the RB filters 23R and 23B are arranged on the horizontal and vertical lines which pass the four corner portions of the first B array 28a (the R filters 23R or the B filters 23B).

Meanwhile, the second B array 28b includes an array in which a positional relationship between the B filter 23B and the R filter 23R of the first B array 28a is reversed. Hence, in the second B array 28b, an arrangement of the B filters 23B and an arrangement of the R filters 23R are also point-symmetric with respect to the center of the second B array 28b. Further, in the second B array 28b, the B filters 23B are arranged on the vertical line which pass the R filter 23R of the first A array 27a, and the R filters 23R are arranged on the horizontal line which pass the B filter 23B of the second A array 27b. Furthermore, one or more of each of the RB filters 23R and 23B are arranged on the horizontal and vertical lines which pass the four corner portions of the second B array 28b.

Figure 12:
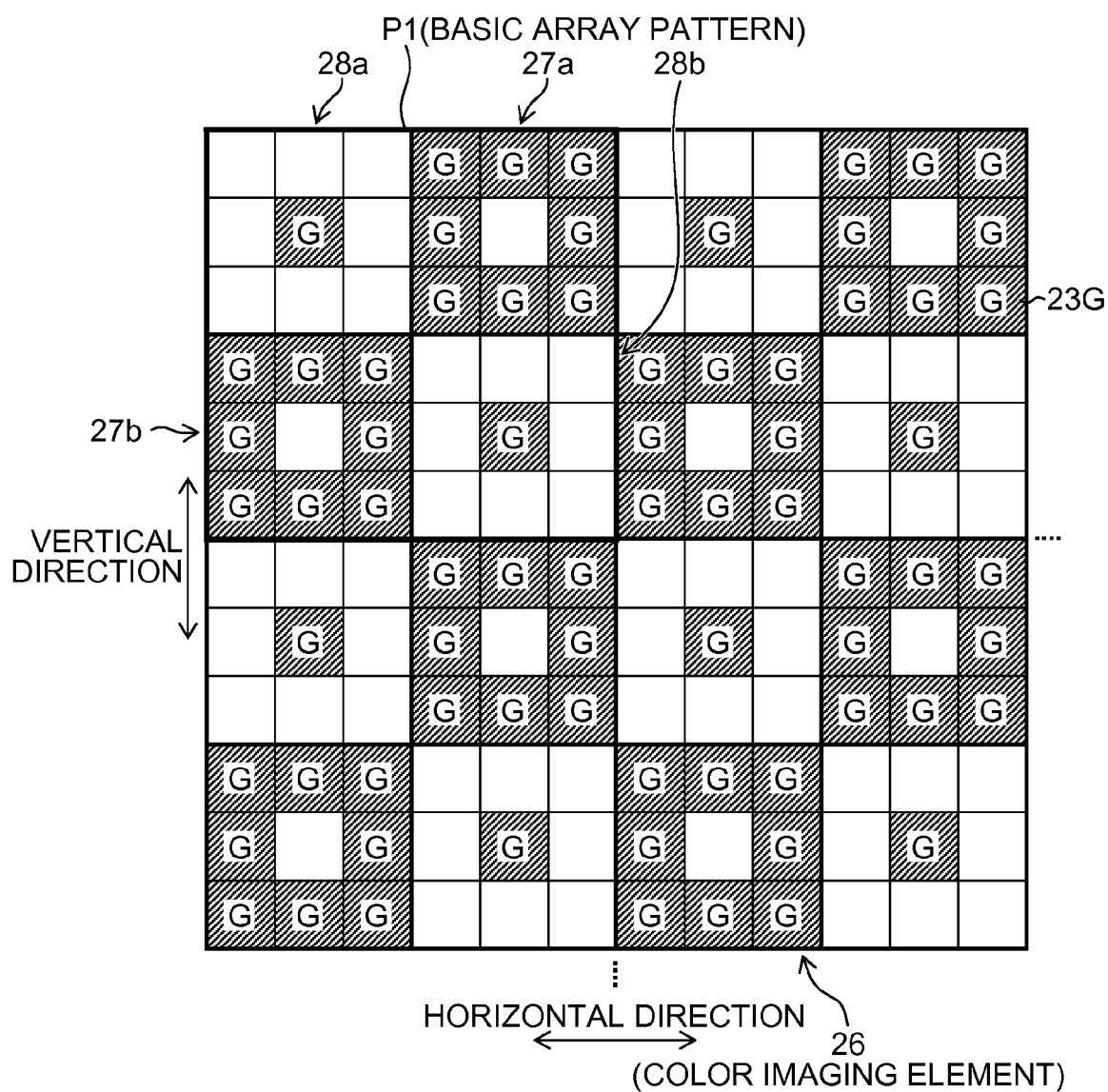
FIG. 12 is a view illustrating only G filters of the color filter array.

As illustrated in FIG. 12, when the basic array pattern P1 employing the above-mentioned configuration is aligned and arranged in the horizontal direction and the vertical direction of the color filter array, the G filters 23G in the first and second B arrays 28a and 28b are positioned on the diagonal (NE, NW) lines along diagonal lines of the first and second B arrays 28a and 28b. Further, any G filters 23G in the first and second A arrays 27a and 27b are positioned on other horizontal, vertical and diagonal (NE, NW) lines. Hence, the G filters 23G are arranged on the horizontal, vertical and diagonal (NE and NW) lines. Consequently, the color filter array includes the above-mentioned feature (2).

Figure 13:
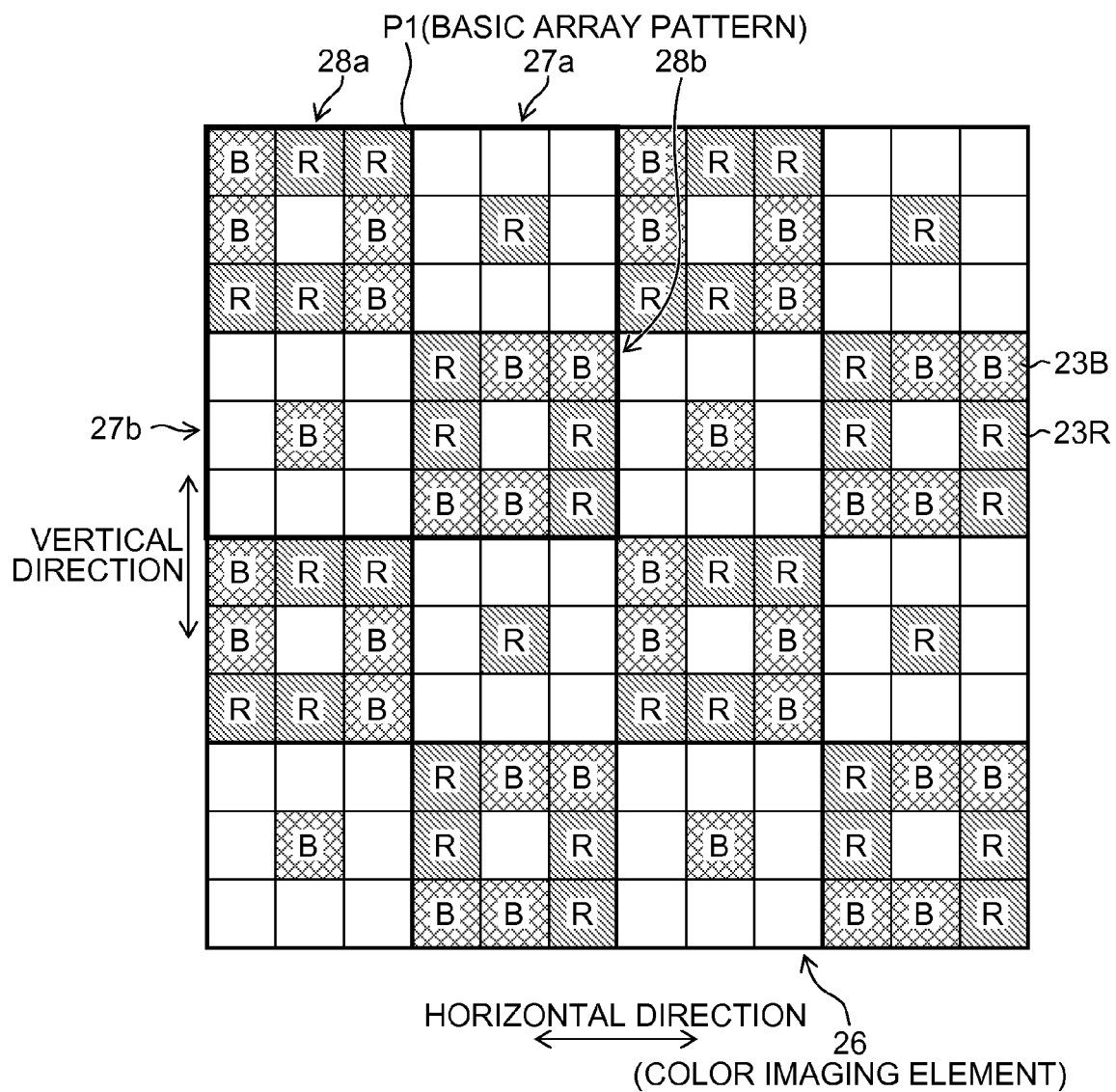
FIG. 13 is a view illustrating only R and B filters of the color filter array.

As illustrated in FIG. 13, one or more of the RB filters 23R and 23B are arranged on the horizontal and vertical lines which pass the center portion and the four corner portions of each of the arrays 27a, 27b, 28a and 28b in each basic array pattern P1, that is, are arranged on the horizontal and vertical lines in the basic array pattern P1. Consequently, the color filter array includes the above-mentioned feature (4).

[Feature (7)]

Further, when the basic array pattern P1 employing the above-mentioned configuration is aligned and arranged in the horizontal direction and the vertical direction of the color filter array, each positional relationship of the RB filters 23R and 23B is reversed between the first A array 27a and the second A array 27b, as well as between the first B array 28a and the second B array 28b, so that one or more of each of the RB filters 23R and 23B are also arranged on the diagonal (NE and NW) lines of the color filter array (feature (7)).

The RB filters 23R and 23B are also arranged on each of the diagonal lines (NE, NW), so that, while only the above-mentioned feature (4) is satisfied, it is possible to suppress color moire (false color) generated by an input image having a high frequency component in the diagonal directions (NE, NW). Consequently, it is possible to suppress color moire (false color) generated by an input image having a high frequency component in the diagonal directions without arranging, on the optical path from the incidence plane to the imaging plane of the optical system, the optical low pass filter having anisotropy in the diagonal (NE, NW) directions. Alternatively, even when the optical low pass filter is applied, it is possible to suppress specific color moire by applying an optical low pass filter whose function of cutting a high frequency component for preventing generation of false color is weak. Consequently, it is possible to prevent the resolutions in the diagonal directions from lowering.

[Feature (8)]

Figure 14:
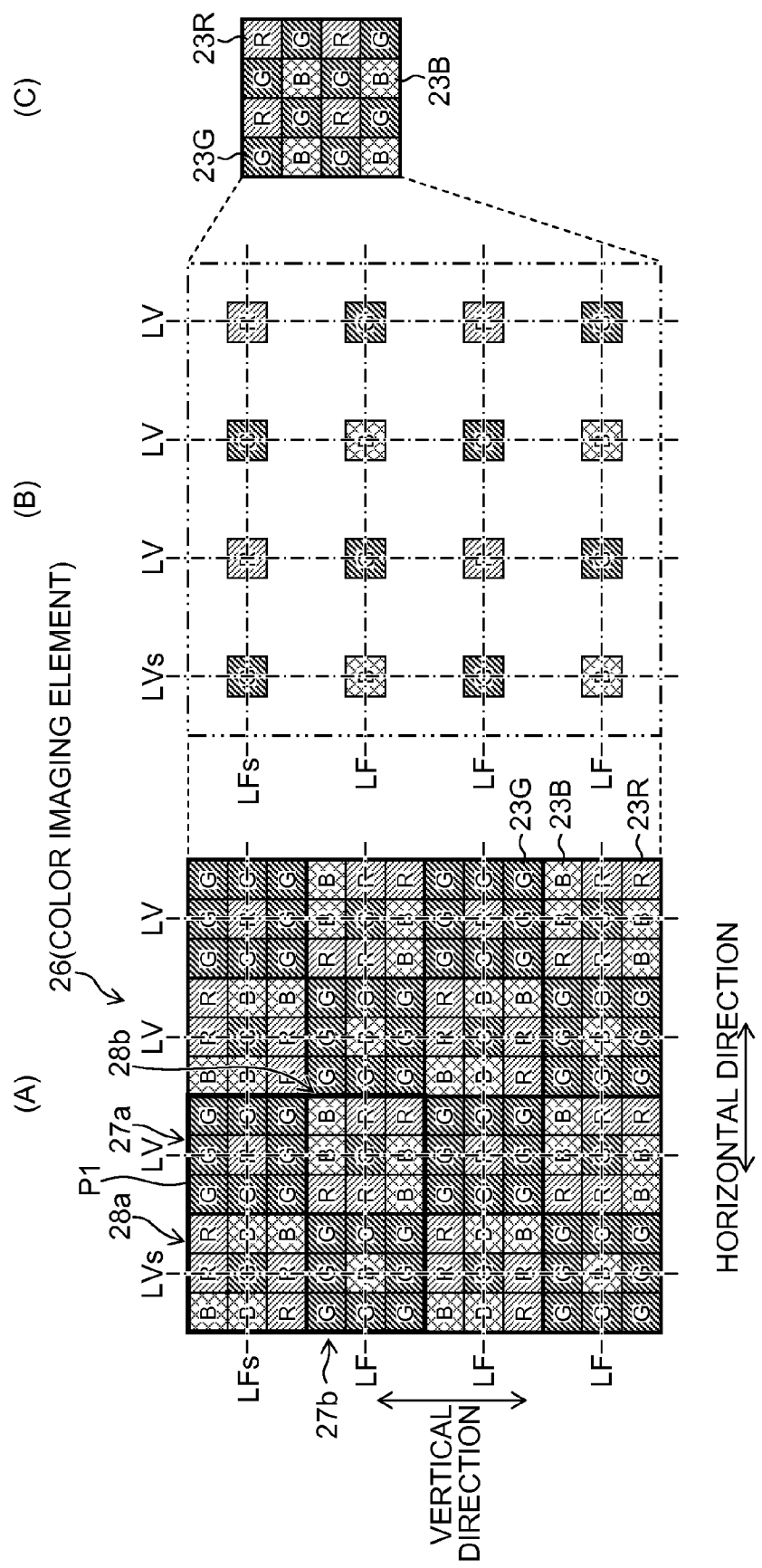
FIG. 14 is a view for explaining the color filter array when the color imaging element according to the second embodiment is thinned, read and driven.

As indicated by the A portion in FIG. 14, a horizontal line and a vertical line which pass the G filter 23G of the first B array 28a at, for example, the upper left corner in the figure are referred to as a "horizontal line LFs" and a "vertical line LVs", respectively. Further, horizontal lines which are arranged at three line intervals in the vertical direction of the color filter array based on the horizontal line LFs are referred to as "horizontal lines LF". Furthermore, vertical lines which are arranged at three line intervals in the horizontal direction of the color filter array based on the vertical line LVs are referred to as "vertical lines LV".

As indicated by the B portion and the C portion in FIG. 14, the RGB filters 23R, 23G and 23B arranged at positions of intersections between the horizontal lines LFs, LF and the vertical lines LVs, LV form the Bayer array. Consequently, when a line corresponding to each of the horizontal and vertical lines LFs, LF, LVs and LV of the color imaging element 26 is thinned, read and driven (thinned to ⅓ and driven) upon movie shooting or the like, it is possible to perform demosaicing processing or the like corresponding to the known Bayer array. As a result, even when the color imaging element 26 is thinned, read and driven, the demosaicing processing or the like does not become complicated.

Figure 15:
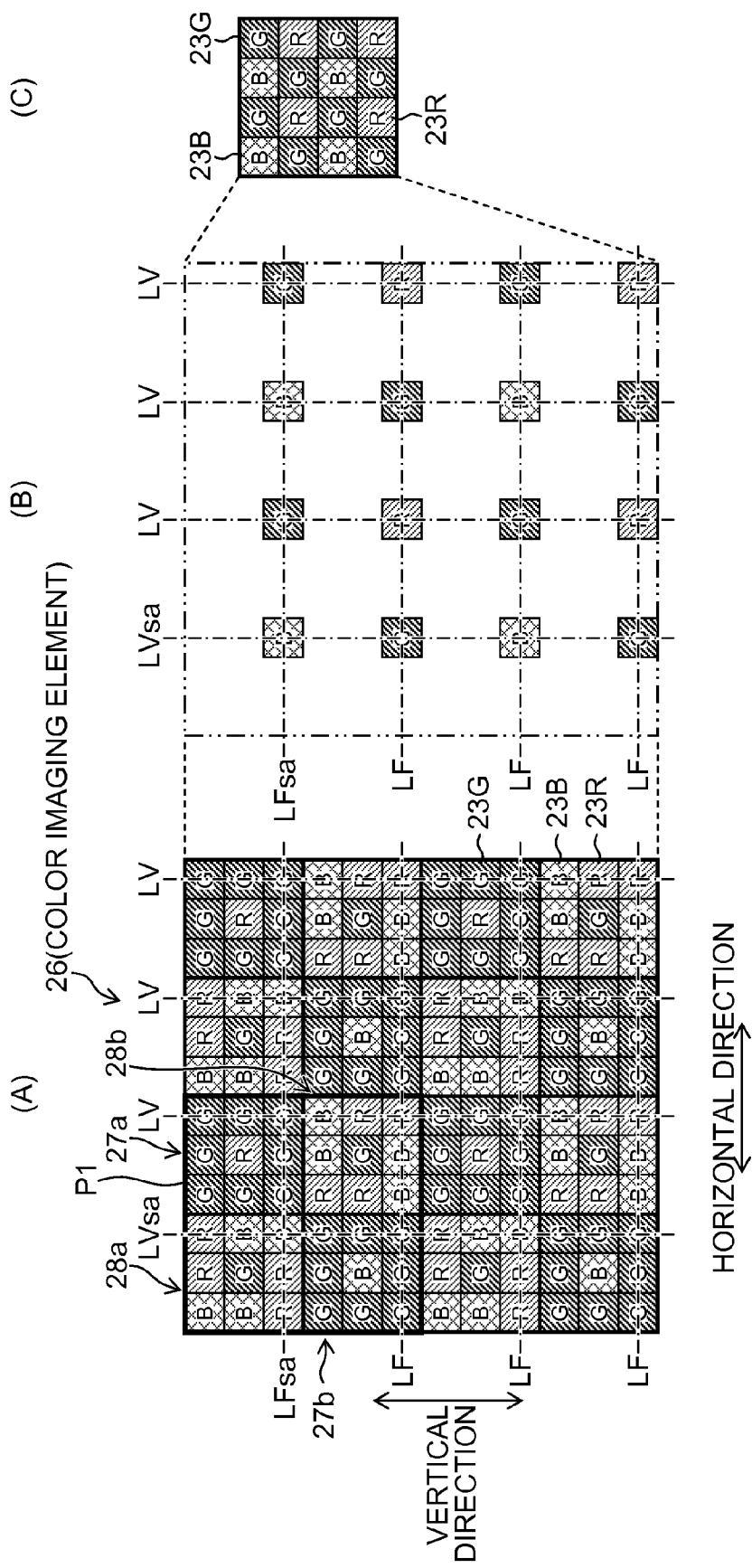
FIG. 15 is a view for explaining the color filter array when the color imaging element according to the second embodiment is thinned, read and driven in a different way from the example illustrated in FIG. 14.

Further, as indicated by the A to C portions in FIG. 15, a horizontal line and a vertical line which pass the B filters 23B of the first B array 28a at the upper left corner in the figure are referred to as a horizontal line LFsa and a vertical line LVsa, respectively. Also in this case, the RGB filters 23R, 23G and 23B arranged at positions of intersections between the horizontal lines LF arranged at three line intervals in the vertical direction of the color filter array based on the horizontal line LFsa, and the vertical lines LV arranged at three line intervals in the horizontal direction of the color filter array based on the vertical line LVsa form a Bayer array.

In the color filter array employing the above-mentioned configuration, the RGB filters 23R, 23G and 23B arranged at positions of intersections between the horizontal lines LF and the vertical lines LV arranged at three line intervals in each of the vertical and horizontal directions of the color filter array based on the horizontal line and the vertical line which pass an arbitrary color filters form the Bayer array (feature (8)). Consequently, when the color imaging element 26 is thinned to ⅓ and driven, it is possible to perform demosaicing processing or the like corresponding to the known Bayer array.

Back to FIG. 8, the numbers of pixels of R pixels, G pixels and B pixels corresponding to the RGB filters 23R, 23G and 23B (abbreviated as the numbers of pixels of RGB pixels below when necessary) in the basic array pattern P1 are 9 pixels, 18 pixels and 9 pixels. Hence, the ratios of the numbers of pixels of RGB pixels are 1:2:1, so that the color filter array includes the above-mentioned feature (3).

Note that in the second embodiment, the basic array pattern P1 is not point-symmetric with respect to its center, and the color filter array does not include the G square array 25.

As described above, the color filter array according to the second embodiment includes the above-mentioned features (7) and (8) in addition to the same features as the features (1), (2), (3) and (4) of the color filter array according to the first embodiment.

Further, the basic array pattern P1 is formed with an array pattern corresponding to "even number×even number" pixels, so that, when the color imaging element 26 is a CMOS imaging element, one amplifier circuit can be shared among four pixels arranged in a square grid pattern (the same applies to other embodiments).

Color Imaging Element According to Third Embodiment

Figure 16:
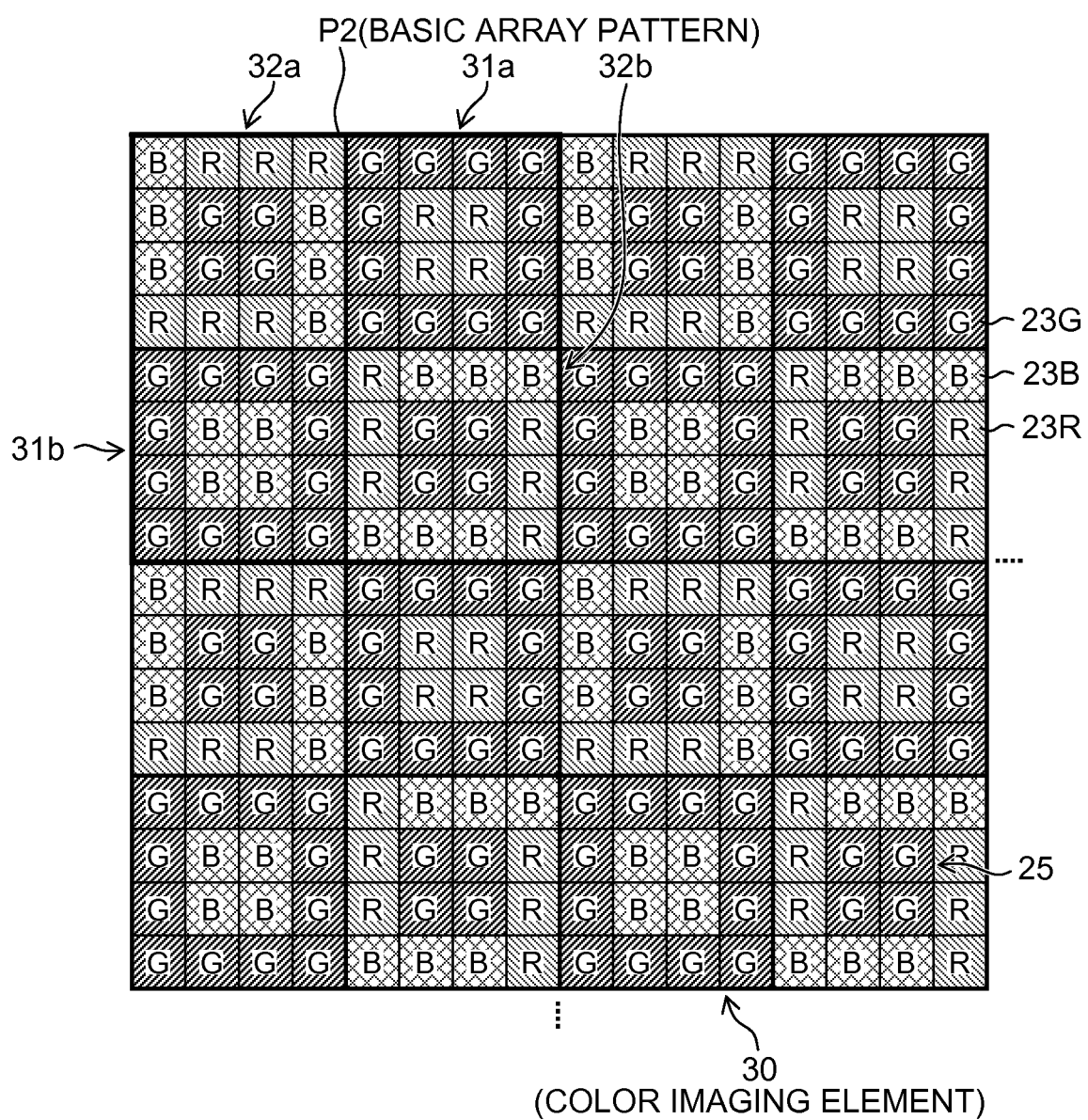
FIG. 16 is a view illustrating a single-plate color imaging element according to the third embodiment of the present invention.

FIG. 16 is a view illustrating a single-plate color imaging element according to a third embodiment of the present invention and, in particular, illustrates a color filter array of the color imaging element. In the above-mentioned second embodiment, the basic array pattern P1 is a square array pattern corresponding to 6×6 pixels, and each of the A and B arrays 27a, 27b, 28a and 28b is a square array corresponding to 3×3 pixels. By contrast with this, in the color imaging element 30 according to the third embodiment, sizes of the basic array pattern and each of the A and B arrays are enlarged compared to the second embodiment.

Note that a configuration according to the third embodiment is basically the same as the configuration according to the above-mentioned second embodiment except that sizes of the basic array pattern and each of the A and B arrays are different, and therefore functions and configurations that are same as the functions and the configurations according to the second embodiment are assigned the same reference numerals, and the description thereof are omitted (the same also applies to the fourth embodiment).

The color filter array of the color imaging element 30 (referred to simply as a color filter array below) includes a basic array pattern P2 in which the RGB filters 23R, 23G and 23B are arrayed according to an array pattern corresponding to 8×8 pixels, and is formed by repeatedly arranging the basic array pattern P2 in the horizontal direction and the vertical direction. Consequently, the color filter array includes the above-mentioned feature (1).

Figure 17:
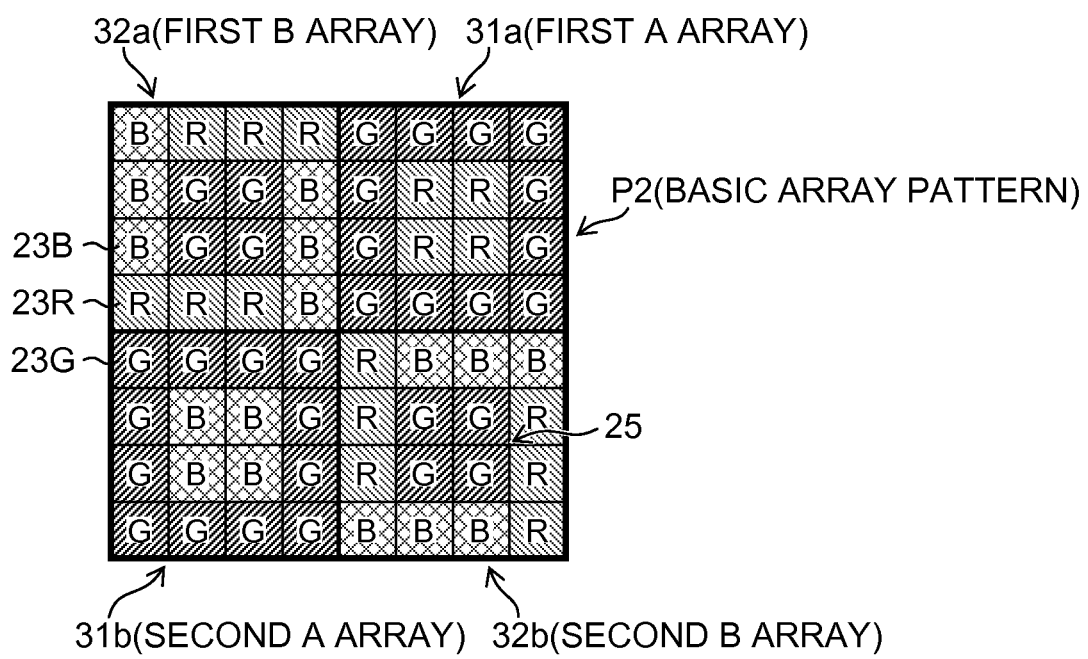
FIG. 17 is a view illustrating a basic array pattern included in a color filter array of the color imaging element according to the third embodiment.

As illustrated in FIG. 17, the basic array pattern P2 is formed with a first A array 31a and a second A array 31b, and a first B array 32a and a second B array 32b. Each of the arrays 31a, 31b, 32a and 32b is an array in which each of the A and B arrays 27a, 27b, 28a and 28b according to the second embodiment is enlarged to an array pattern corresponding to 4×4 pixels. Note that an arrangement of each of the A and B arrays 31a, 31b, 32a and 32b in the basic array pattern P2 is the same as the arrangement of each of the A and B arrays 27a, 27b, 28a and 28b according to the second embodiment illustrated in FIG. 9.

The G filters 23G are arranged in the outer peripheral portion of the first A array 31a in a rectangular shape. Further, the R filters 23R are arranged in the center portion of the first A array 31a surrounded by the G filters 23G according to a square array pattern corresponding to 2×2 pixels. Meanwhile, the second A array 31b is an array in which the R filters 23R of the first A array 31a are replaced with the B filters 23B.

A G square array 25 in which the G filters 23G are arranged according to a square array pattern corresponding to 2×2 is provided in the center portion of the first B array 32a. Consequently, the color filter array includes the above-mentioned feature (5).

Further, the RB filters 23R and 23B are arranged in the outer peripheral portion of the first B array 32a to surround the G filters 23G. Specifically, the B filters 23B and the R filters 23R are alternately arranged three pixels by three pixels (BBBRRRBBBRRR) along the counterclockwise direction in the figure from the upper left corner of the first B array 32a in the figure. Meanwhile, the second B array 32b includes an array in which a positional relationship between the B filters 23B and the R filters 23R of the first B array 32a is reversed.

In the first and second B arrays 32a and 32b, the B filters 23B and the R filters 23R are arranged point-symmetrically with respect to respective centers of the first and second B arrays 32a and 32b, similar to the second embodiment. Further, the B filters 23B are arranged on the horizontal and vertical lines which pass the R filters 23R of the first A array 31a, and the R filters 23R are arranged on the horizontal and vertical lines which pass the B filters 23B of the second A array 31b. Furthermore, one or more of each of the RB filters 23R and 23B are arranged on the horizontal and vertical lines which pass the four corner portions of each of the B arrays 32a and 32b. Consequently, one or more of each of the RB filters 23R and 23B are arranged on the horizontal and vertical lines in the basic array pattern P2. As a result, the color filter array includes the above-mentioned feature (4).

Back to FIG. 16, even when the basic array pattern P2 employing the above-mentioned configuration is aligned and arranged in the horizontal direction and the vertical direction of the color filter array, the G filters 23G are arranged on the horizontal, vertical and diagonal (NE, NW) lines of the color filter array, similar to the second embodiment. Further, one or more of each of the RB filters 23R and 23B are arranged on the diagonal (NE, NW) lines of the color filter array. Consequently, the color filter array includes the above-mentioned features (2) and (7).

Further, the numbers of pixels of R pixels, G pixels and B pixels corresponding to the RGB filters 23R, 23G and 23B in the basic array pattern P2 are 16 pixels, 32 pixels and 16 pixels. Hence, the ratios of the numbers of pixels of RGB pixels are 1:2:1, so that the color filter array includes the above-mentioned feature (3).

Figure 18:
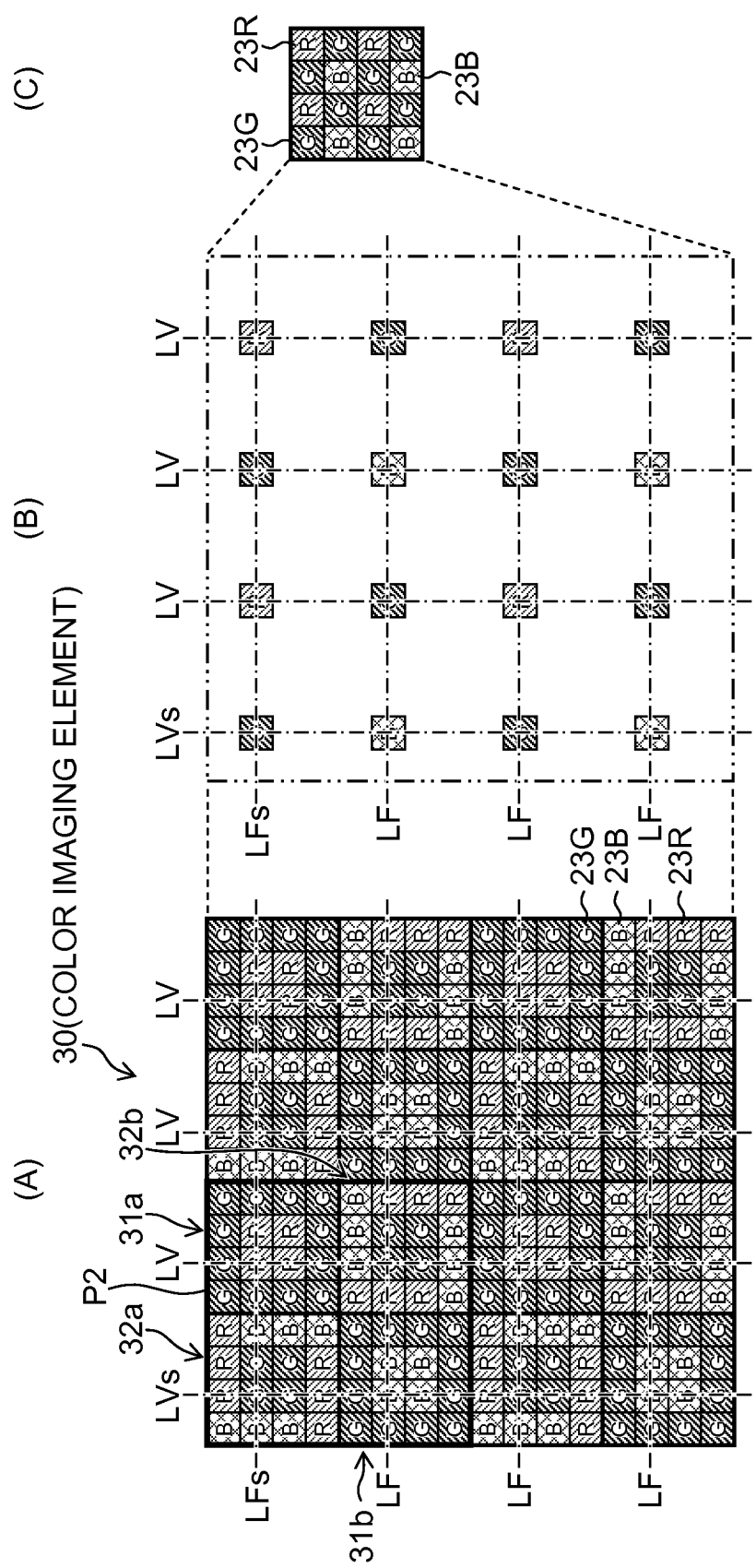
FIG. 18 is a view for explaining the color filter array when the color imaging element according to the third embodiment is thinned, read and driven.

Further, as indicated by the A portion in FIG. 18, horizontal lines and vertical lines arranged at four line intervals each in the vertical and horizontal directions of the color filter array, based on the horizontal line LFs and the vertical line LVs which pass an arbitrary color filter of the color filter array are referred to as "horizontal lines LF" and "vertical lines LV". As indicated by the B portion and the C portion in FIG. 18, the RGB filters 23R, 23G and 23B arranged at positions of intersections between the horizontal lines LF and the vertical lines LV form the Bayer array. Consequently, the color filter array includes the above-mentioned feature (8).

Note that the basic array pattern P2 is not point-symmetric with respect to its center.

As described above, the color filter array according to the third embodiment includes the same features as the features (7) and (8) of the color filter array according to the second embodiment in addition to the features (1), (2), (3), (4) and (5) of the color filter array according to the first embodiment.

Color Imaging Element According to Fourth Embodiment

Figure 19:
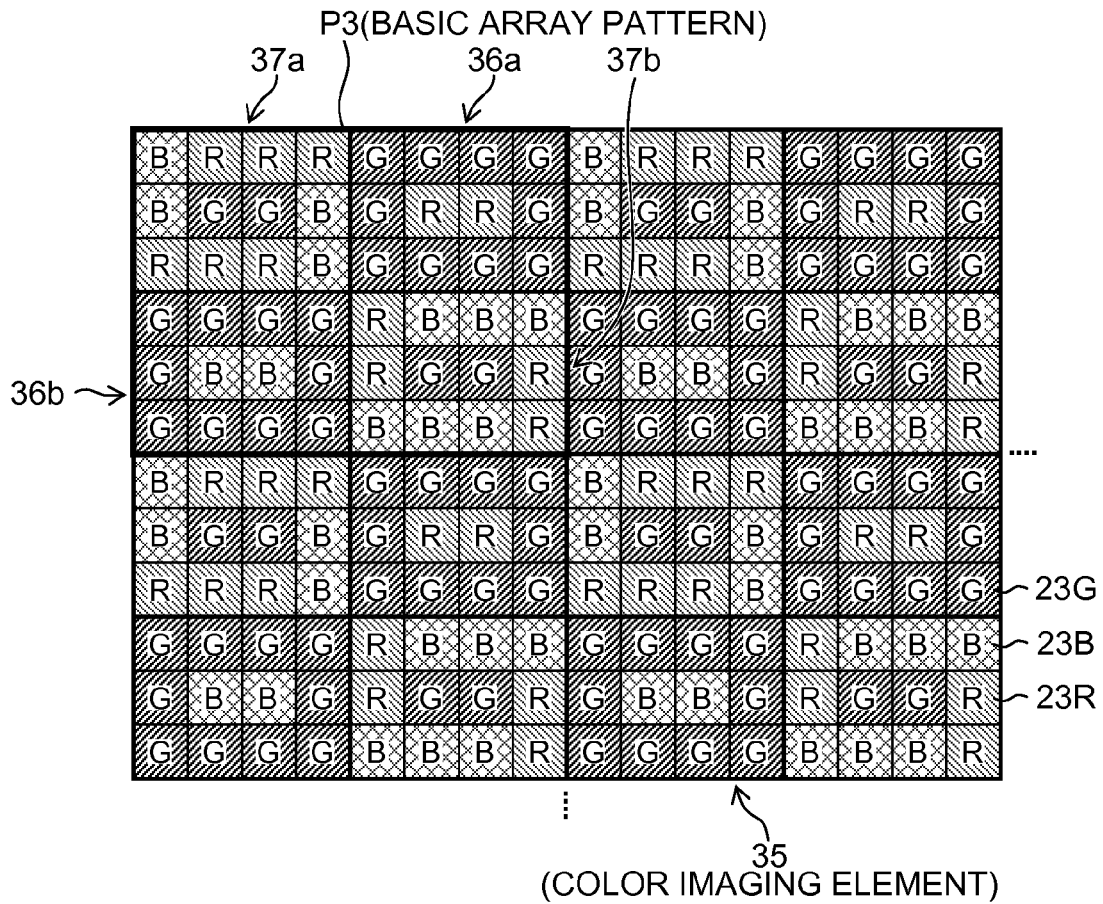
FIG. 19 is a view illustrating a single-plate color imaging element according to the fourth embodiment of the present invention.

FIG. 19 is a view illustrating a single-plate color imaging element according to the fourth embodiment of the present invention and, in particular, illustrates a color filter array of the color imaging element. Although the basic array pattern includes the square array pattern in the above-mentioned second and third embodiments, in a color imaging element 35 according to the fourth embodiment, a basic array pattern includes an array pattern corresponding to M×N (M≠N, both are even numbers of 6 or more in the fourth embodiment) pixels.

The color filter array of the color imaging element 35 (referred to simply as a color filter array below) includes a basic array pattern P3 in which the RGB filters 23R, 23G and 23B are arrayed according to an array pattern corresponding to 8×6 pixels, and is formed by repeatedly arranging the basic array pattern P3 in the horizontal direction and the vertical direction. Consequently, the color filter array includes the above-mentioned feature (1).

Figure 20:
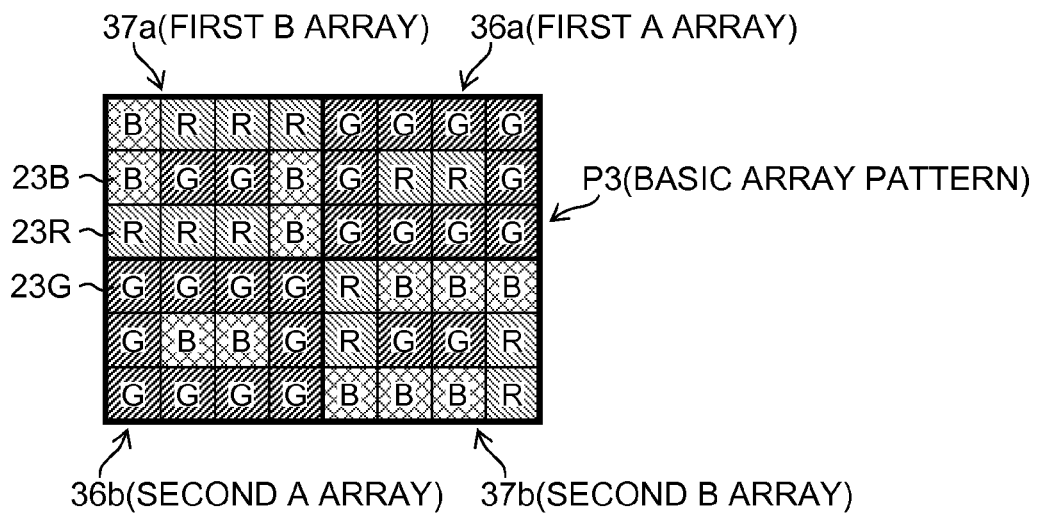
FIG. 20 is a view illustrating a basic array pattern included in the color filter array of the color imaging element according to the fourth embodiment.

As illustrated in FIG. 20, the basic array pattern P3 is formed by a first A array 36a and a second A array 36b, and a first B array 37a and a second B array 37b. Each of the A and B arrays 36a, 36b, 37a and 37b is formed by changing each of the A and B arrays according to the second and third embodiments to an array pattern corresponding to 3×4 pixels.

The G filters 23G are arranged in the outer peripheral portion of the first A array 36a in a rectangular pattern. Further, the two R filters 23R are aligned and arranged in the center portion of the first A array 36a in the horizontal direction. Meanwhile, the second A array 36b is an array in which the R filters 23R of the first A array 36a are replaced with the B filters 23B, similar to the second and third embodiments.

The G filters 23G are aligned and arranged in the center portion of the first B array 37a in the horizontal direction. Further, the RB filters 23R and 23B are arranged in the outer peripheral portion of the first B array 37a to surround the G filters 23G. Specifically, the two B filters 23B and the three R filters 23R are alternately arranged (BBRRRBBRRR) along the counterclockwise direction in the figure from the upper left corner of the first B array 37a in the figure. Meanwhile, the second B array 37b includes an array in which a positional relationship between the B filters 23B and the R filters 23R of the first B array 37a is reversed.

Thus, each of the A and B arrays 36a, 36b, 37a and 37b includes basically the same array pattern as the array pattern of each of the A and B arrays according to the second and third embodiments except that sizes are different. Hence, similar to the second and third embodiments, one or more of each of the RB filters 23R and 23B are arranged on the horizontal and vertical lines in the basic array pattern P3. Consequently, the color filter array includes the above-mentioned feature (4).

Back to FIG. 19, even when the basic array pattern P3 employing the above-mentioned configuration is aligned and arranged in the horizontal direction and the vertical direction of the color filter array, the G filters 23G are arranged on the horizontal, vertical and diagonal (NE, NW) lines of the color filter array, similar to the second and third embodiments. Further, one or more of each of the RB filters 23R and 23B are arranged on the diagonal (NW, NW) lines of the color filter array. Consequently, the color filter array includes the above-mentioned features (2) and (7).

Further, the numbers of pixels of the RGB pixels corresponding to the RGB filters 23R, 23G and 23B in the basic array pattern P3 are 12 pixels, 24 pixels and 12 pixels. Hence, the ratios of the numbers of pixels of RGB pixels are 1:2:1, so that the color filter array includes the above-mentioned feature (3).

Figure 21:
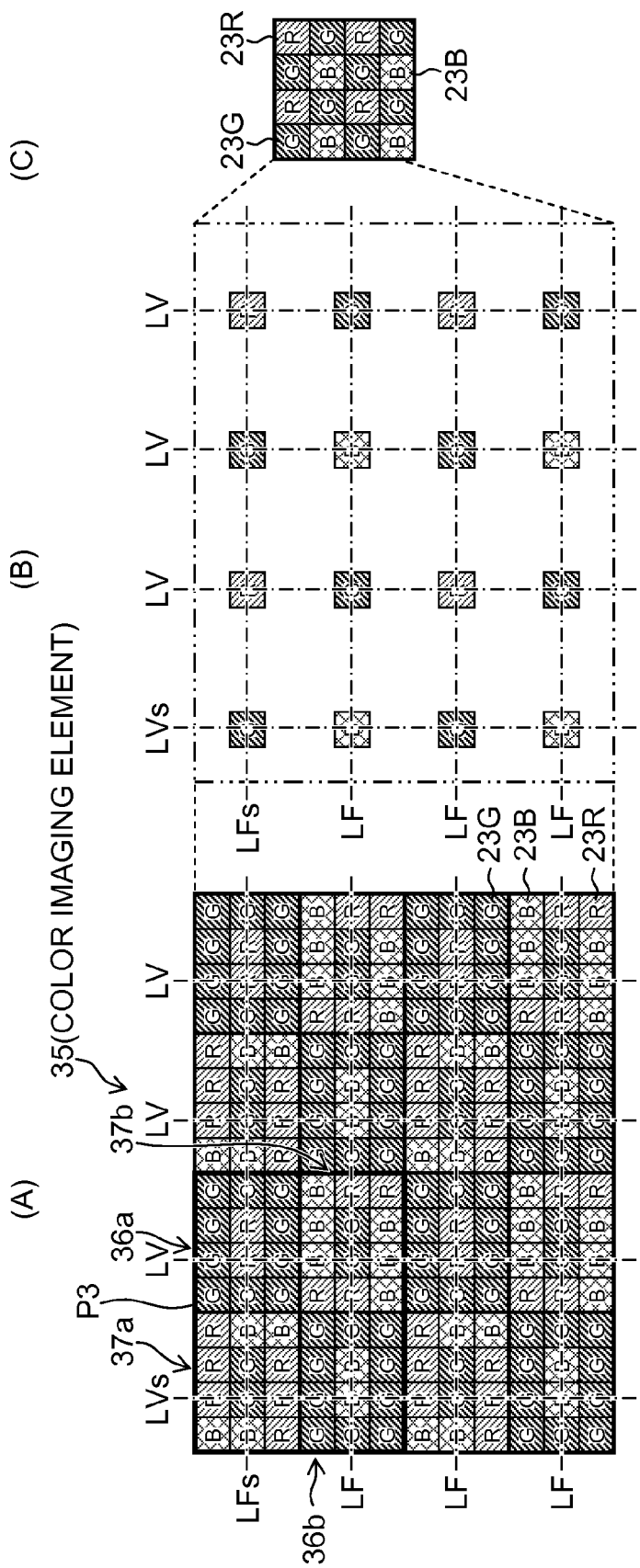
FIG. 21 is a view for explaining a color filter array upon thinning, reading and driving of the color imaging element according to the fourth embodiment.

Further, as indicated by the A portion, the B portion and the C portion in FIG. 21, in the color filter array according to the fourth embodiment, the RGB filters 23R, 23G and 23B arranged at positions of intersections between each horizontal line LF and each vertical line LV also form the Bayer array. Horizontal lines LF are each arranged at three line intervals in the vertical direction of the color filter array based on the horizontal line LFs which passes an arbitrary color filter. Further, vertical lines LV are each arranged at four line intervals in the horizontal direction of the color filter array based on the vertical line LVs which passes the same color filter. Consequently, the color filter array includes the above-mentioned feature (8).

Note that the basic array pattern P3 is not point-symmetric with respect to its center, and the color filter array does not include the G square array 25.

As described above, the color filter array according to the fourth embodiment includes the same features as the features (7) and (8) of the color filter array according to the second embodiment in addition to the features (1), (2), (3) and (4) of the color filter array according to the first embodiment.

[Other]

Although the basic array patterns P1 to P3 include array patterns corresponding to 6×6 pixels, 8×8 pixels and 6×8 pixels in the above-mentioned second to fourth embodiments, the basic array pattern may include an array pattern corresponding to M×N pixels (M and N may be even numbers of 6 or more, either M=N or M≠N, in case of M≠N either M or N may be larger) other than the pixels above. In this case, each of the first and second A arrays and the first and second B arrays include array patterns corresponding to (M/2)×(N/2) pixels. Further, an arrangement of the RGB filters 23R, 23G and 23B in each array is basically the same as the arrangement according to each of the above-mentioned embodiments.

Furthermore, the RGB filters 23R, 23G and 23B arranged at positions of intersections between the horizontal lines LF arranged at (M/2) line intervals in the vertical direction of the color filter array and the vertical lines LV arranged at (N/2) line intervals in the horizontal direction based on the horizontal line LFs and the vertical line LVs which pass an arbitrary color filter form the Bayer array.

Note that it is preferable that M and N are 10 or less. This is because, when M and N exceed 10 (M, N>10), while signal processing such as demosaicing processing becomes complicated, a special effect cannot be provided even by increasing a size of the basic array pattern.

Arrangements of the R filters 23R and the B filters 23B according to each of the above-mentioned embodiments are not limited to the arrangements illustrated in FIGS. 3 to 21, and may be adequately changed as long as at least the above-mentioned feature (4) is satisfied. Further, respective arrangements of the first A array and the second A array, as well we the first B array and the second B array may be switched, and arrangements of the first and second A arrays and the first and second B arrays may be switched.

Modified Example

Further, although, in each of the above-mentioned embodiments, the description has been made about the examples where green (G) is adopted as the first color and red (R) and blue (B) are adopted as the second color, the colors which can be used for a color filter are not limited to these colors, and a color filter corresponding to a color satisfying the following conditions can also be used.

<Conditions of First Filter (First Color)>

Although in each embodiment, the description has been made about the example where G filter of the G color is regarded as the first filter having the first color of the present invention, a filter which satisfies one of the following conditions (1) to (4) may be used instead of the G filter or instead of part of the G filters.

[Condition (1)]

The condition (1) is that a contribution rate for acquiring a brightness signal is 50% or more. This contribution rate 50% is a value determined to distinguish between the first color (e.g. the G color) and the second color (e.g. R and B colors) of the present invention, and is a value determined so that the "first color" includes a color whose contribution rate for acquiring brightness data is relatively higher than the contribution rates of the R color and the B color or the like.

Note that the colors whose contribution rates are less than 50% are the second color (e.g. the R color, the B color or the like) of the present invention, and filters which have these colors are the second filters of the present invention.

[Condition (2)]

The condition (2) is that a peak of a filter transmittance is in a range of wavelength 480 nm or more and 570 nm or less. A value measured by, for example, a spectral meter is used for the filter transmittance. This wavelength range is a range determined to distinguish between the first color (e.g. the G color) and the second color (e.g. the R and B colors) of the present invention, and is a range determined not to include peaks of the R color, the B color and the like whose contribution rates described above are relatively low and to include a peak of the G color and the like whose contribution rate is relatively high. Hence, a filter whose peak of the transmittance is in the range of wavelength 480 nm or more and 570 nm or less can be used for the first filter. Note that the filters whose peaks of the transmittances are outside the range of wavelength 480 nm or more and 570 nm or less are the second filters (the R filter and the B filter) of the present invention.

[Condition (3)]

The condition (3) is that the transmittance in a range of wavelength 500 nm or more and 560 nm or less is higher than the transmittances of the second filters (the R filter and the B filter). Again in this condition (3), a value measured by, for example, a spectral meter is used for the filter transmittance. The wavelength range of this condition (3) is a range determined to distinguish between the first color (e.g. the G color) and the second color (e.g. R and B colors) of the present invention, and is a range in which the transmittance of a filter including a color whose contribution rate described above is relatively higher than the R color and the B color or the like is higher than the transmittances of the R B filters. Consequently, it is possible to use as the first filter a filter whose transmittance is relatively high in the range of wavelength 500 nm or more and 560 nm or less, and use as the second filters the filters whose transmittances are relatively low.

[Condition (4)]

The condition (4) is to use the filters of two or more colors which include the color contributing the most to a brightness signal (e.g. the G color of RGB) out of three primary colors and a color different from these three primary colors, as the first filters. In this case, filters corresponding to colors other than each color of the first filters are the second filters.

<A Plurality Types of First Filter (G Filter)>

Consequently, G filters of the G color as the first filter is not limited to one type, and, for example, a plurality of types of G filters (G1 filter, G2 filter) can also be used as the first filters. That is, the G filters of a color filter (basic array pattern) according to each of the above-mentioned embodiments may be adequately replaced with the G1 filters or the G2 filters. The G1 filter allows transmission of G light of a first wavelength band, and the G2 filter allows transmission of G light of a second wavelength band which is highly correlated with the G1 filter (see FIG. 22).

Existing G filters (e.g. the G filters according to the first embodiment) can be used for the G1 filters. Further, filters which are highly correlated with the G1 filters can be used for the G2 filters. In this case, a peak value of a spectral sensitivity curve of a light receiving element on which the G2 filter is arranged is desirably in the range of wavelength, for example, 500 nm to 535 nm (near a peak value of a spectral sensitivity curve of the light receiving element on which the existing G filter is arranged). Note that a method described in, for example, Japanese Patent Application Laid-Open No. 2003-284084 can be used for the method of determining color filters of four colors (R, G1, G2 and B).

By setting four types of colors of an image acquired by a color imaging element and increasing pieces of color information to be acquired in this way, it is possible to more accurately express colors compared to a case where only three types of colors (RGB) are acquired. That is, it is possible to reproduce colors which seem different to the eyes as different colors and colors which seem the same to the eyes as the same colors (to enhance "the color determinability").

Note that the transmittances of the G1 and G2 filters are basically the same as the transmittance of the G filter according to the first embodiment, and the contribution rate for acquiring a brightness signal is higher than 50%. Hence, the G1 and G2 filters satisfy the above-mentioned condition (1).

Figure 22:
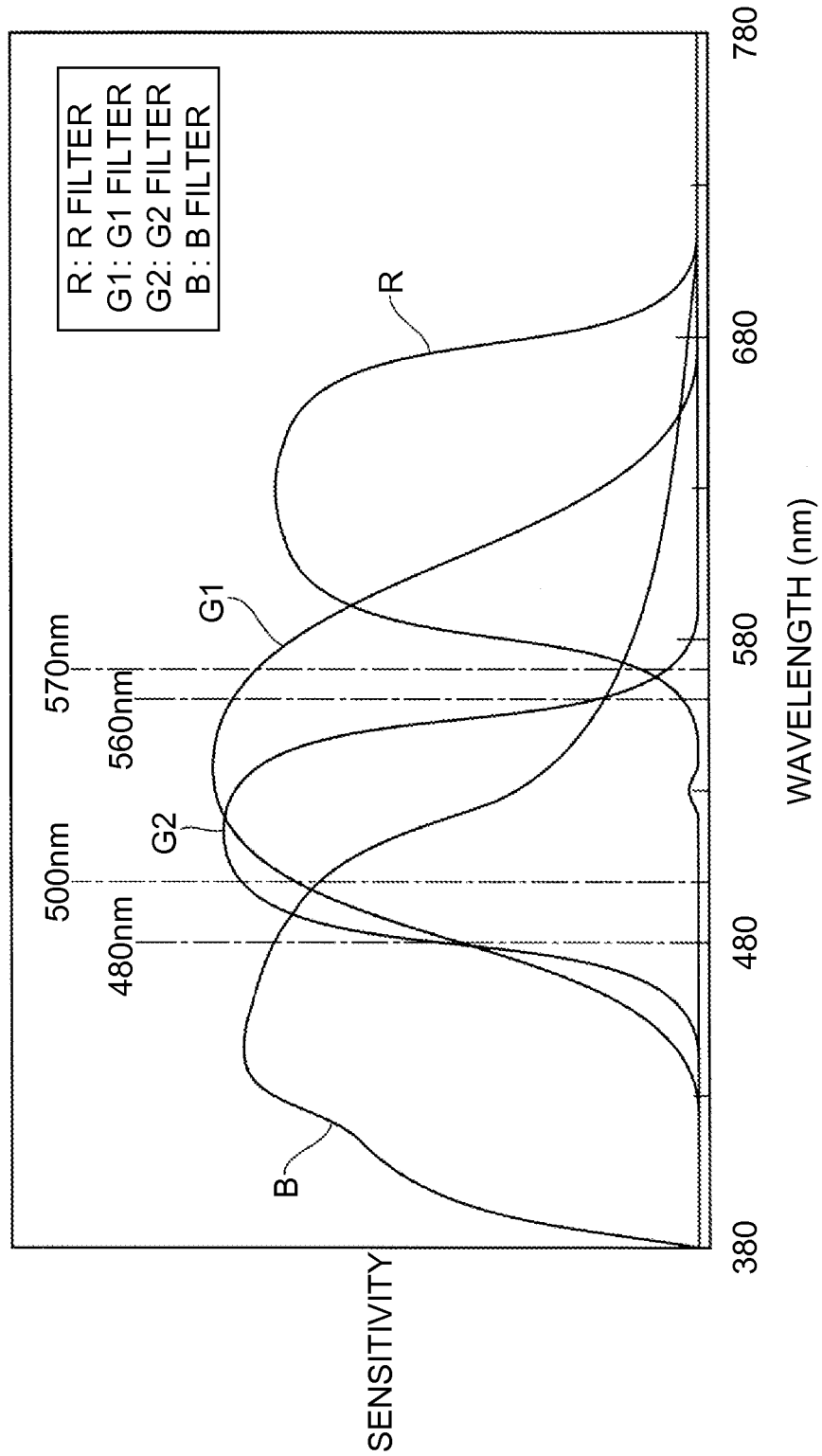
FIG. 22 is a graph illustrating spectral sensitivity characteristics of light receiving elements on which an R filter (red filter), a G1 filter (first green filter), a G2 filter (second green filter) and a B filter (blue filter) are arranged.

Further, in FIG. 22 which illustrates spectral sensitivity characteristics of a color filter array (light receiving element), a peak of the transmittance of each of the G1 and G2 filters (a peak of the sensitivity of each G pixel) is in the range of wavelength 480 nm or more and 570 nm or less. The transmittance of each of the G1 and G2 filters is higher than the transmittances of R and B filters in the range of wavelength 500 nm or more and 560 nm or less. Hence, each of the G1 and G2 filters also satisfies the above-mentioned conditions (2) and (3).

Note that the arrangement and the number of each of the G1 and G2 filters may be adequately changed. Further, types of G filters may be increased to three types or more.

<Transparent Filter (W Filter)>

Although color filters including chromatic filters corresponding to RGB colors have been mainly described in the above-mentioned embodiments, part of these chromatic filters may be transparent filters W (white pixels). The transparent filters W are preferably arranged instead of a part of the first filters (G filters) in particular. Consequently, by replacing a part of G pixels with white pixels, it is possible to suppress deterioration of color reproducibility even when a pixel size is miniaturized.

The transparent filter W is a filter of a transparent color (first color). The transparent filter W is a filter which allows transmission of light corresponding to a wavelength band of visible light, and whose transmittance of light, for example, of each color of RGB is 50% or more. The transmittance of the transparent filter W is higher than the transmittance of the G filter, and the contribution rate for acquiring a brightness signal is also higher than the G color (60%), so that the above-mentioned condition (1) is satisfied.

Figure 23:
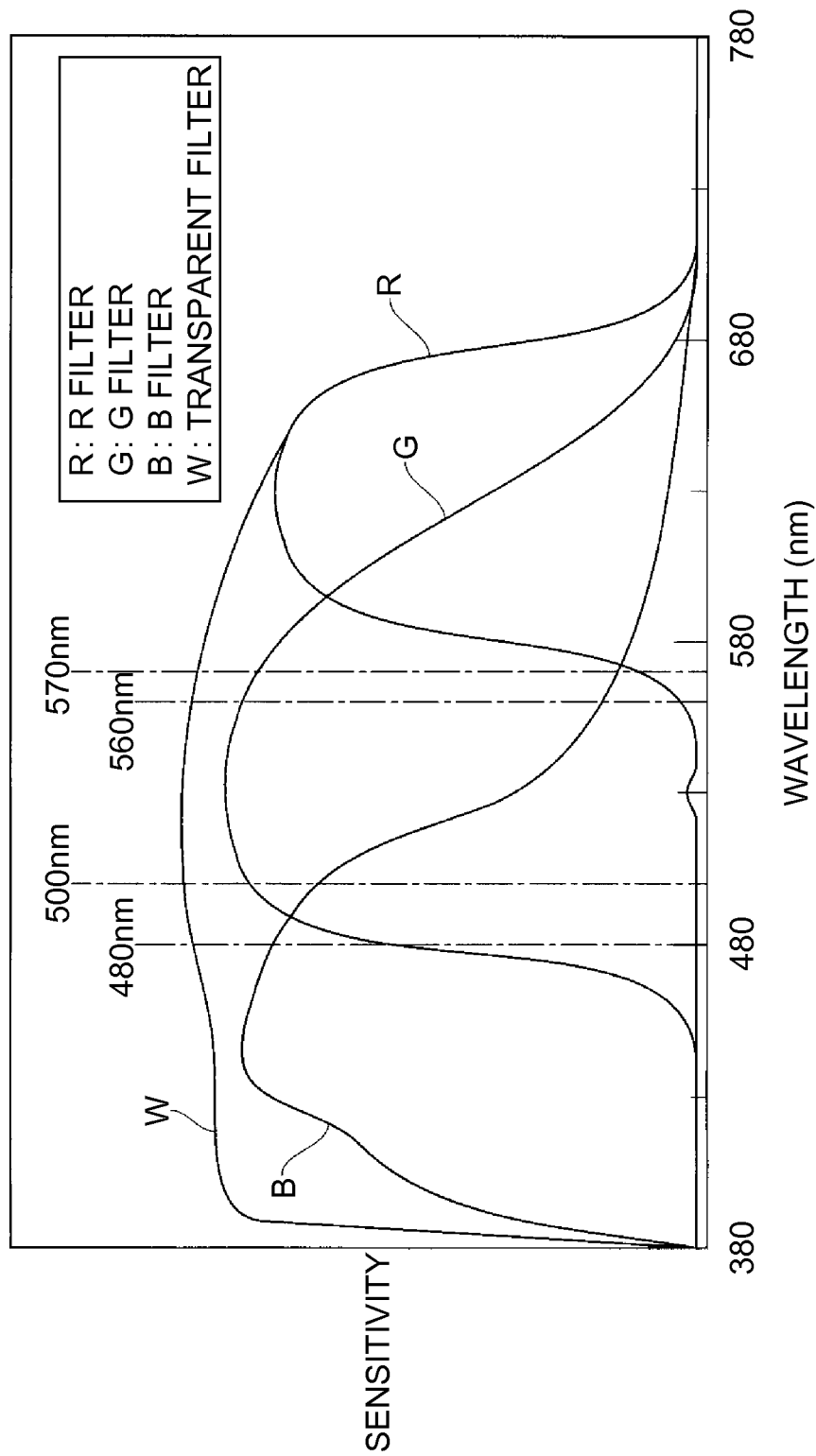
FIG. 23 is a graph illustrating spectral sensitivity characteristics of light receiving elements on which the R filter, the G filter, the B filter and a W filter (transparent filter) are arranged.

In FIG. 23 which illustrates spectral sensitivity characteristics of a color filter array (light receiving element), a peak of the transmittance of the transparent filter W (a peak of the sensitivity of a white pixel) is in the range of wavelength 480 nm or more and 570 nm or less. Further, the transmittance of the transparent filter W is higher than the transmittances of R and B filters in the range of wavelength 500 nm or more and 560 nm or less. Hence, the transparent filter W also satisfies the above-mentioned conditions (2) and (3). Note that the G filter also satisfies the above-mentioned conditions (1) to (3) similar to the transparent filter W.

As described above, the transparent filter W satisfies the above-mentioned conditions (1) to (3), and can be used for the first filter of the present invention. Note that in the color filter array, a part of the G filters corresponding to the G color which contributes the most to a brightness signal among the three primary colors RGB is replaced with the transparent filters W, and, consequently, the transparent filter W also satisfies the above-mentioned condition (4).

<Emerald Filter (E Filter)>

Although a color filter formed with chromatic filters corresponding to RGB colors has been mainly described in the above-mentioned embodiments, a part of these chromatic filters may be other chromatic filters, and may be, for example, filters E (emerald pixels) corresponding to an emerald (E) color. The emerald filters (E filters) may be arranged instead of a part of the first filters (G filters) in particular. Thus, by using a color filter array of four colors whose part of G filters are replaced with the E filters, it is possible to enhance reproducibility of high band components of brightness, reduce jagginess and enhance the sense of resolution.

Figure 24:
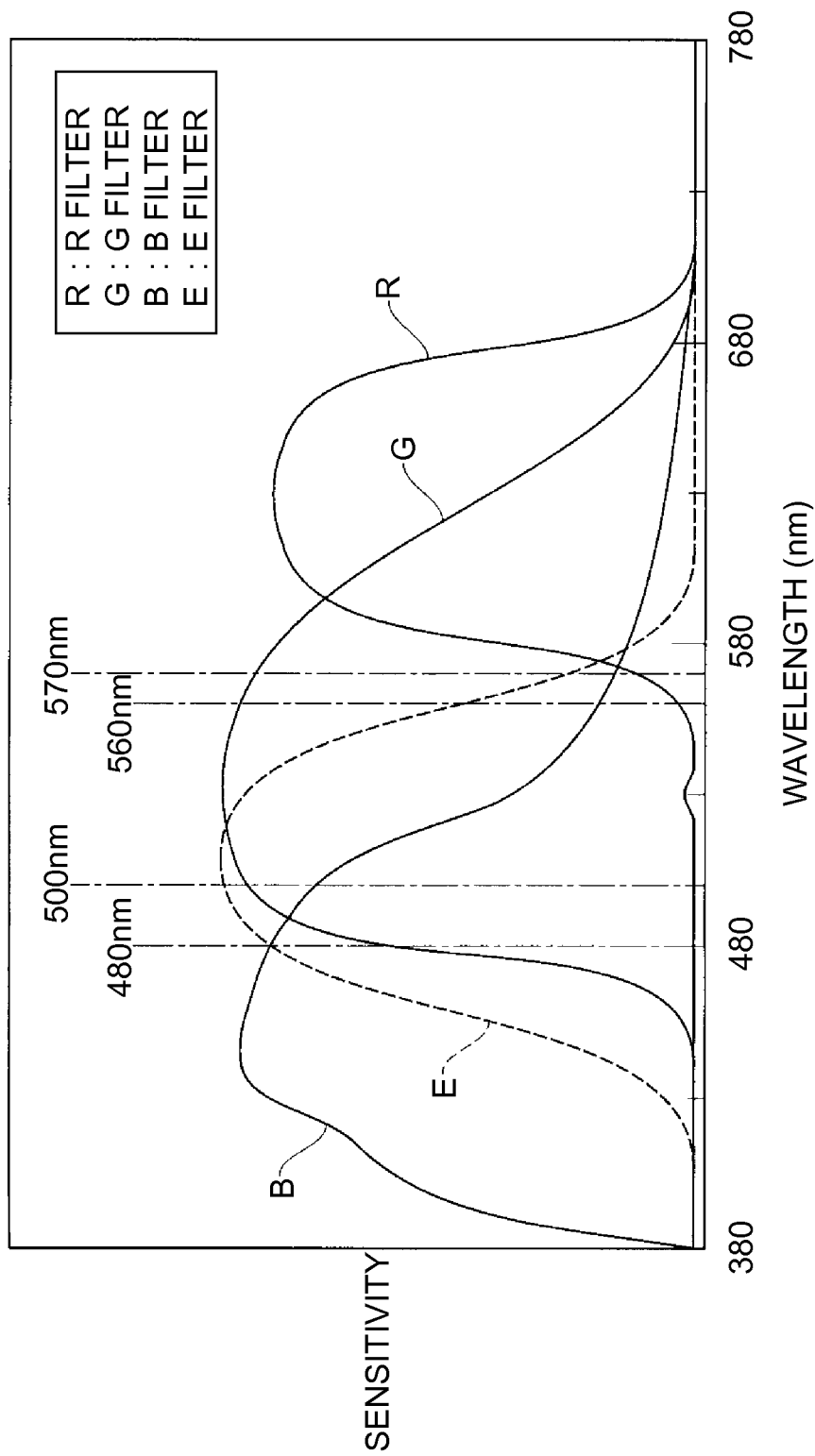
FIG. 24 is a graph illustrating spectral sensitivity characteristics of light receiving elements on which the R filter, the G filter, the B filter and an emerald filter (E filter) are arranged.
Figure 25:
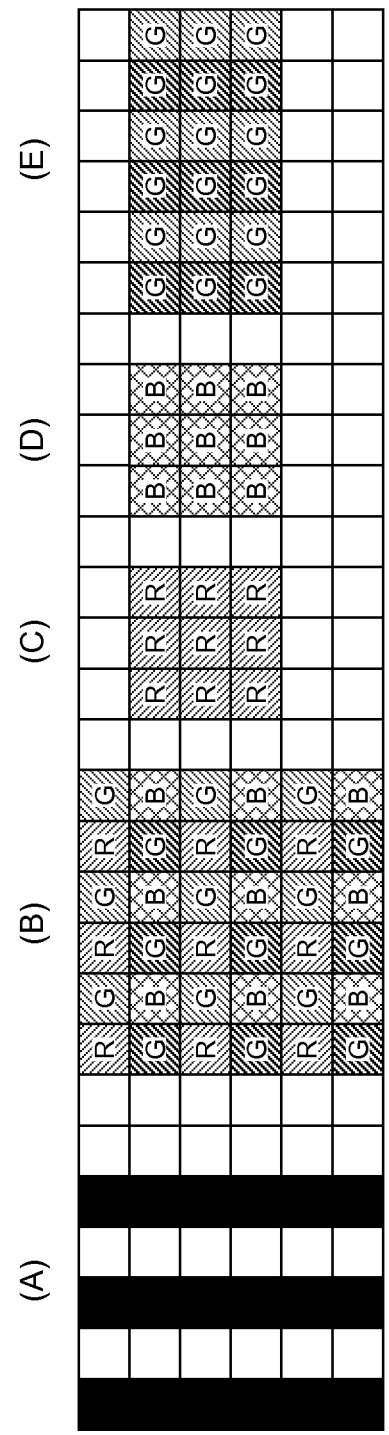
FIG. 25 is a view used to explain a problem of a color imaging element which has color filters of a conventional Bayer array.
Figure 26:
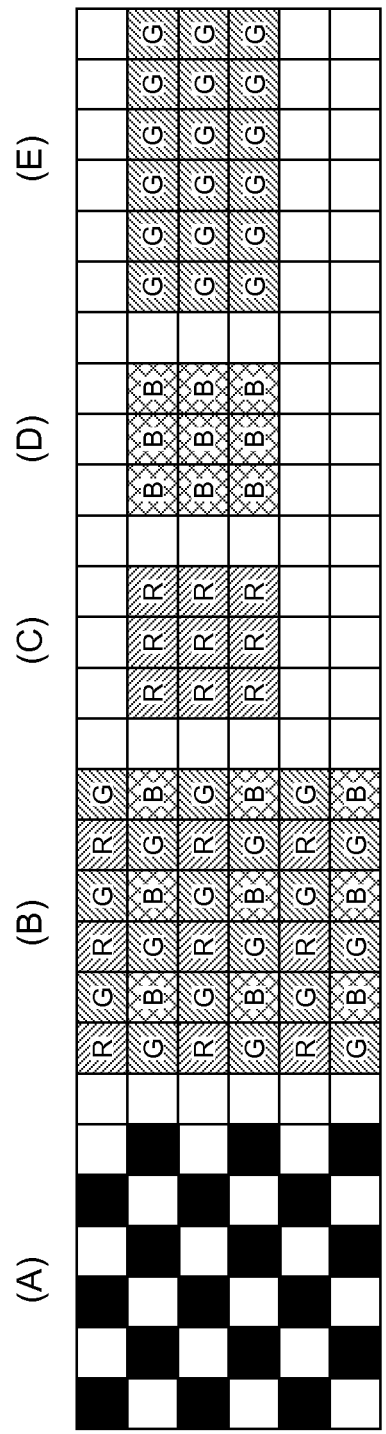
FIG. 26 is another view used to explain a problem of the color imaging element which has the color filters of the conventional Bayer array.

In FIG. 24 which illustrates spectral sensitivity characteristics of a color filter array (light receiving element), a peak of the transmittance of the emerald filter E (a peak of sensitivity of the E pixel) is in the range of wavelength 480 nm or more and 570 nm or less. Further, the transmittance of the emerald filter E is higher than the transmittances of the R B filters in the range of wavelength 500 nm or more and 560 nm or less. Hence, the emerald filter E satisfies the above-mentioned conditions (2) and (3). Further, in the color filter array, a part of the G filters corresponding to the G color which contributes the most to a brightness signal among the three primary colors of RGB are replaced with the emerald filters E, and consequently, the emerald filter E also satisfies the above-mentioned condition (4).

Note that in the spectral characteristics illustrated in FIG. 24, the emerald filter E has a peak closer to a short wavelength side than a peak of the G filter, but may have a peak closer to a long wavelength side than the peak of the G filter (the color looks like little yellow-tinged) in some cases. Thus, filters which satisfy each condition of the present invention can be selected for the emerald filter E, and, for example, the emerald filter E which satisfies the condition (1) can also be selected.

<Types of Other Colors>

Although the color filter array formed with color filters of the primary colors RGB has been described in each of the above-mentioned embodiments, the present invention is also applicable to, for example, a color filter array of complementary color filters having four colors consisting of G and the complementary colors of the primary colors RGB which are C (cyan), M (magenta) and Y (yellow). Also in this case, color filters which satisfy one of the above-mentioned conditions (1) to (4) are the first filters, and other color filters are the second filters.

<Honeycomb Arrangement>

Although each color filter array according to each of the above-mentioned embodiments includes a basic array pattern formed by two-dimensionally arraying a color filter of each color in the horizontal direction (H) and the vertical direction (V), and is formed by repeatedly arranging the basic array patterns in the horizontal direction (H) and the vertical direction (V), the present invention is not limited to this.

For example, a basic array pattern of so-called honeycomb array configured by rotating the basic array pattern of each of the above-mentioned embodiments by 45° around the optical axis may be used, and a color filter may be configured by an array pattern in which the basic array pattern is repeatedly arranged in the diagonal directions (NE and NW).

Further, needless to say, the present invention is not limited to the above-mentioned embodiments, and various modifications can be made as long as the modifications do not deviate from the spirit of the present invention.

What is claimed is:
1. A single-plate color imaging element which is formed by disposing color filters on a plurality of pixels formed with photoelectric conversion elements arrayed in a horizontal direction and a vertical direction, wherein
- an array of the color filters includes a basic array pattern in which the color filters are arrayed according to an array pattern corresponding to M×N (M and N are even numbers equal to or more than 6) pixels in a horizontal direction and a vertical direction, and is formed by repeatedly arranging the basic array pattern in the horizontal direction and the vertical direction,
- the basic array pattern includes two each of two types of a first sub array and a second sub array in which the color filters are arrayed according to an array pattern corresponding to (M/2)×(N/2) pixels, the first and second sub arrays being arranged mutually adjacent in the horizontal direction and the vertical direction,
- the color filters include first filters corresponding to a first color with one or more colors and second filters corresponding to a second color with two or more colors whose contribution rates for acquiring a brightness signal are lower than a contribution rate of the first color, a ratio of a number of pixels of the first color corresponding to the first filter being greater than a ratio of a number of pixels of each color of the second color corresponding to the second filters,
- the first filters are arranged in a rectangular shape in an outer peripheral portion of the first sub array, and are arranged in a center portion of the second sub array, and
- one or more of the second filters corresponding to each color of the second color are arranged on each filter line of the array of the color filter in the horizontal and vertical directions in the basic array pattern.

2. The color imaging element according to claim 1, wherein one or more of the second filters are arranged on lines in diagonal upper right and diagonal lower right directions of the array of the color filters.

3. The color imaging element according to claim 2, wherein the second filters of the different second color are arranged in center portions of the two first sub arrays in the basic array pattern.

4. The color imaging element according to claim 2, wherein arrangements of the second filters corresponding to each color of the second color are mutually different in the two second sub arrays in the basic array pattern.

5. The color imaging element according to claim 2, wherein the second filters corresponding to each color of the second color in the second sub array are each arranged point-symmetrically with respect to a center of the second sub array.

6. The color imaging element according to claim 4, wherein
- the first color is green (G) and the second color is red (R) and blue (B), and
- a Bayer array is formed by the first and second filters arranged at positions of intersections between vertical lines arranged at (M/2) line intervals in the horizontal direction and horizontal lines arranged at (N/2) line intervals in the vertical direction of the array of the color filters, based on a horizontal line and a vertical line including an arbitrary color filter of the array of the color filters.

7. The color imaging element according to claim 1, wherein, when the M and the N are each 8 or more, a square array corresponding to 2×2 pixels formed with the first filters is included in a center portion of the second sub array.

8. The color imaging element according to claim 1, wherein the M and the N are each 10 or less.

9. The color imaging element according to claim 1, wherein the M and the N satisfy M=N.

10. The color imaging element according to claim 1, wherein the M and the N satisfy M≠N.

11. An imaging apparatus comprising the color imaging element according to claim 1.

* * * * *